United States Patent
Applegate et al.

(10) Patent No.: US 9,658,470 B2
(45) Date of Patent: May 23, 2017

(54) METHOD AND ALGORITHM FOR DESIGNING CUSTOM OPTICS

(71) Applicants: Raymond A. Applegate, Houston, TX (US); Jason D. Marsack, Houston, TX (US); Konrad Pesudovs, Gleneig (AU); Yue Shi, Houston, TX (US)

(72) Inventors: Raymond A. Applegate, Houston, TX (US); Jason D. Marsack, Houston, TX (US); Konrad Pesudovs, Gleneig (AU); Yue Shi, Houston, TX (US)

(73) Assignee: University of Houston System, Houston, TX (US)

( * ) Notice: Subject to any disclaimer, the term of this patent is extended or adjusted under 35 U.S.C. 154(b) by 16 days.

(21) Appl. No.: 14/191,902

(22) Filed: Feb. 27, 2014

(65) Prior Publication Data
US 2014/0176900 A1 Jun. 26, 2014

Related U.S. Application Data

(63) Continuation-in-part of application No. 12/084,881, filed as application No. PCT/US2006/043613 on Nov. 9, 2006, now Pat. No. 9,022,570.

(60) Provisional application No. 60/734,823, filed on Nov. 9, 2005.

(51) Int. Cl.
| | |
|---|---|
| *G02C 3/00* | (2006.01) |
| *G02C 7/00* | (2006.01) |
| *G02C 7/02* | (2006.01) |
| *G02C 7/04* | (2006.01) |

(52) U.S. Cl.
CPC ............... *G02C 7/04* (2013.01); *G02C 7/027* (2013.01); *G02C 2202/22* (2013.01)

(58) Field of Classification Search
CPC ......... A61B 3/103; A61B 3/02; A61B 3/1015; G02C 7/04; G02C 7/02; A61F 2009/00872
USPC ..... 351/200, 205, 206, 246, 159.73, 159.74, 351/159.78
See application file for complete search history.

(56) References Cited

U.S. PATENT DOCUMENTS

2006/0279699 A1* 12/2006 Liang .......................... 351/246

* cited by examiner

*Primary Examiner* — James Greece
(74) *Attorney, Agent, or Firm* — Benjamin Aaron Adler

(57) ABSTRACT

Provided herein is a computer program product comprising a non-transitory computer-readable medium storing an algorithm to optimize a wavefront guided correction for a custom ophthalmic lens. The correction is determined from inputs of quantified wavefront error and registration uncertainty and a metric predictive of a visual performance task of interest and provides a level of visual performance within a user-defined performance range. Also provided is a method for optimizing a wavefront guided correction for a custom ophthalmic lens via inputting residual wavefront error values and quantified translational and rotational movements into an algorithm configured to determine the optimal wavefront guided correction therefrom and a custom ophthalmic lens comprising the correction.

18 Claims, 23 Drawing Sheets

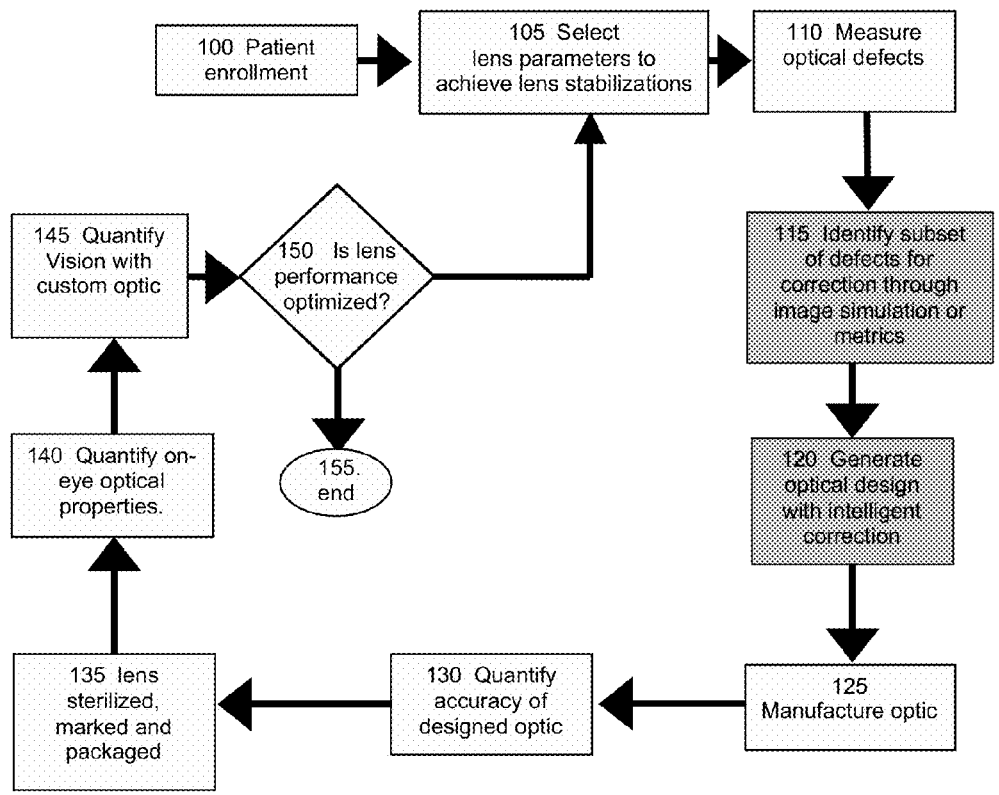
FIG. 1
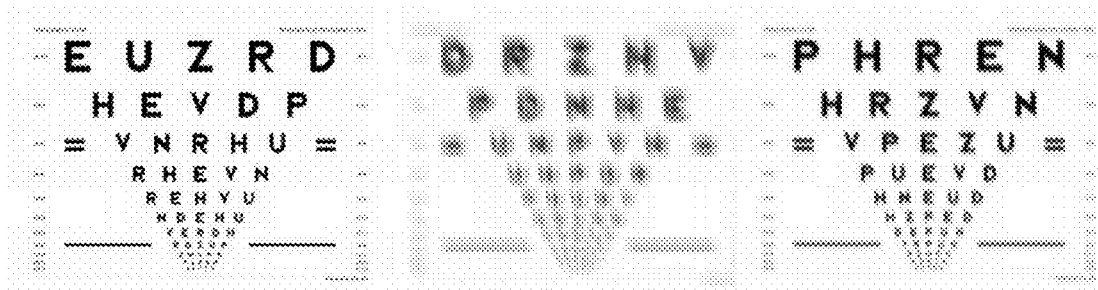
FIG. 2A  FIG. 2B  FIG. 2C

700a

```
%% stochastic gradient descent alogrithm on the optimization of Wavefront
    guided correction function StochasticGradientDescent
clear;clc;close;
format compact thisFolder = pwd;
zernikeShifterAssembly = NET.addAssembly(fullfile(thisFolder,'ZernikeShifterBin',
   'Release', 'ZernikeShifter.dll'));
defaultDataFolder='C:\Users\yshi\Documents\MATLAB\StochasticGradientDescent
\Data';
%% 1. parameters
%input of pupil daiameter and wavelength
Prompt={'Pupil radius of interest','Radial Order of Correction','Iterations',
'Purtabation Gain','Correction Gain(T)'};
Name='Patient Parameters';
Numlines=1;%one line for enter
Defaultanswer={'3','5','200','0.005','200'};%set default answer
Parameter=inputdlg(Prompt,Name,Numlines,Defaultanswer);%set parameter
   interface
if length(Parameter)<1
   msgbox('The program has been cancelled.');
   error('your quitting error message');%if 'cancel'is pressed, the program stops
else
   rMax = eval(Parameter{1});
   cOrder = eval(Parameter{2});
   run = eval(Parameter{3});
   Purta = eval(Parameter{4});
   T = eval(Parameter{5});
   %if 'cancel' is not pressed, array and exponent are going to be used
End nCoeff= (1+(cOrder+1))*(cOrder+1)/2-3; % 5th order: nCoeff= 18; 4th order:
nCoeff= 12; 3rd order: nCoeff= 7; 2rd order nCoeff= 3
weight=ones(1,66);
```

```
% % how many runs for the alogrith
% run=1;
% cOrder=4;%upto which radial order to correct
% % how many zernike coefficients to be adjusted (from C3 the astigmatism)
% % Purtabation gain
% Purta = 0.005;
% T=200;
% %weighting for each coefficients % %weight(1,5)= 3;
%
% %parameter for zerShifter
% rMax = 2.5; % mm % rMax= pupil radius of interest on the form of CLshifter
% %rFit = 1; % the pupil radius on the file of aberration zer and correction
 zer.rFit = 3.5614;

%parameters for qualitymetrics
PupilDia =(rMax*2)*10^(-3);
lambda = 555e-009;
modes = 1:66; %(or better, take 66 from the length of Zc)
metricType = [0 1 0]; %calculate only psf related metrics
doit=zeros(11,3);%doit is a 3 colomn vector to indicate which metric to be calculated
doit(11,2)=1;%indicates only vsx is calculated showit= 0; %to start
saveit = 0;  %(to start)

%% 1. Read WFE
[fileName,pathName,fileIndex] = uigetfile('*.zer','Select patient aberration profile', ...
    fullfile(defaultDataFolder));
if fileIndex == 0, return; end;
abberationFilePath = fullfile(pathName,fileName);
[abberationAtRFit,rFitA] = ReadZernikes(abberationFilePath);
if isempty(abberationAtRFit), return ;end;
```

```
% read correction
[fileName,pathName,fileIndex] = uigetfile('*.zer','Select correction aberration profile',
fullfile(defaultDataFolder));
if fileIndex == 0, return; end;
correctionFilePath = fullfile(pathName,fileName);
[correctionAtRFit,rFitC] = ReadZernikes(correctionFilePath);
if isempty(correctionAtRFit), return ;end;

% read the movement file
[fileName,pathName,fileIndex] = uigetfile('*.csv','Select movement file',
    fullfile(defaultDataFolder));
if fileIndex == 0, return; end;
movementFilePath = fullfile(pathName,fileName);
movementData = dlmread(movementFilePath,',',1,1);

%w%where to save the file
[fileName,pathName,fileIndex] = uiputfile('*.xls','name the file to write output data',
    fullfile(defaultDataFolder));
if fileIndex == 0, return; end;
outputFilePath = fullfile(pathName,fileName);

%% 2. make the initial correction (full correction of terms up to 4th order)
U=zeros(run,66,3);%each run has 3 lines. U(run,1,:)= for the aberration,
U(run,2,:)=U+, U(run,3,:)=U-.

% Input a WFE as U1, at the beginning 3 lines are the same, then just make
% changes in interested coefficients.
U(1,:,1)=correctionAtRFit; % This is the initial correction, use the full correction mvmtPos = size(movementData,1);
rawlogVSX = zeros (run,3,mvmtPos); % this is the logVSX array for each correction
avelogVSX = zeros (run,3);

ranArray = zeros (run, 66);%the array for rand values assigned to 66 zernike terms h1 = figure('color','white');

for i=1:run

% generate randon number and calculate deltaU1
% make random numbers to be in pairs, which is in consistent with zernike
% modes
```

```
ranArray=rand(i,nCoeff)*2-1;

% compute U0+ and U0-
deltaU=zeros(1,nCoeff);

for j=1:nCoeff deltaU(j)=ranArray(i,j)*Purta*weight(1,(3+j)); %deltaU=random
number * purtabation gain*weighting in each mode U(i,(3+j),2)=U(i,(3+j),1)+deltaU(j);%U+

U(i,(3+j),3)=U(i,(3+j),1)-deltaU(j);%U-
    end managerObject = ZernikeShifter.ZernikeManager();

managerObject.Initialize(rFitA,abberationAtRFit);
    resizedZernikeObject = managerObject.ResampleZernike(0, 0, rMax,0);
    for ii = 1:resizedZernikeObject.GetLength(0)
    abberationAtRMax(1,ii) = resizedZernikeObject.GetValue(ii-1);
    % #ok<AGROW>
    end % call quality metric function to give vsx, which is pS(11) for U0,U0+,U0- for k=1:3% in this run, for each of the 3 corrections:u+,u- and u0

% Initiation of WFE, WGC
    % call zershifter to provide residuals for each correction managerObject.Initialize(rFitC,U(i,:,k));
%     resizedZernikeObject = managerObject.ResampleZernike(0, 0, rFit, 0);
%     for ii = 1:resizedZernikeObject.GetLength(0)
%         U(i,ii,k) = resizedZernikeObject.GetValue(ii-1); % #ok<AGROW>
%     end simpleZernikes = zeros(mvmtPos,numel(abberationAtRMax));
    for row = 1:mvmtPos
        dx = movementData(row,1);
        dy = movementData(row,2);
        dThetaDegrees = movementData(row,3);
```

```
    correctionZernikes = managerObject.ResampleZernike(dx, dy, rMax,
    dThetaDegrees);
      for ii = 1:correctionZernikes.GetLength(0)
        simpleZernikes(row,ii) = correctionZernikes.GetValue(ii-1);
      end end for row = 1:size(simpleZernikes,1)
      summedZernikes(i,k,row,:) = simpleZernikes(row,:) + abberationAtRMax;
% row is the movement positions path('.\ThibosFiles',path);
        % call quality metrics to provide metrics for each summedZernikes
              [WF,PS,SF,DLnorm]=QualityMetrics(summedZernikes(i,k,row,:),...
% U(i,k,:)should be substitude by summedZernike array
              PupilDia,lambda,modes,metricType,doit,showit,saveit);

rawlogVSX (i,k,row) = log10 (PS(11)); % need to be consistent with
rawlogVSX = zeros (run,3, mvmtPos);
    end
end % Do the average logVSXfor each correction
    % AvelogVSX(i,1)=J0, AvelogVSX(i,2)=J0+, AvelogVSX(i,3)=J0-.

avelogVSX(i,1)= sum (rawlogVSX(i,1,:))/mvmtPos;
    avelogVSX(i,2)= sum (rawlogVSX(i,2,:))/mvmtPos;
    avelogVSX(i,3)= sum (rawlogVSX(i,3,:))/mvmtPos;

%assume the rotation is a normal gaussian distribution, the logvs
    %value takes at -2d,-6/5d,-2/5d,2/5d,6/5d,2d, and weighting for
    %each of them is 0.0548,0.1571, 0.2881, 0.2881, 0.1571, 0.0548
    %avelogVSX(i,1)= rawlogVSX(i,1,1)*0.0548 + rawlogVSX(i,1,2)*0.1571 +
  rawlogVSX(i,1,3)*0.2881 + rawlogVSX(i,1,4)*0.2881 +
  rawlogVSX(i,1,5)*0.1571 + rawlogVSX(i,1,6)*0.0548;
    %avelogVSX(i,2)= rawlogVSX(i,2,1)*0.0548 + rawlogVSX(i,2,2)*0.1571 +
  rawlogVSX(i,2,3)*0.2881 + rawlogVSX(i,2,4)*0.2881 +
  rawlogVSX(i,2,5)*0.1571 + rawlogVSX(i,2,6)*0.0548;
    %avelogVSX(i,3)= rawlogVSX(i,3,1)*0.0548 + rawlogVSX(i,3,2)*0.1571 +
  rawlogVSX(i,3,3)*0.2881 + rawlogVSX(i,3,4)*0.2881 +
  rawlogVSX(i,3,5)*0.1571 + rawlogVSX(i,3,6)*0.0548;
```

```
% calculate log VS as J0,J0+,J0- and deltaJ0
deltaJ(i)= avelogVSX (i,2)- avelogVSX (i,3);

% U1 =U0+T*deltaJ0*deltaU0
    for j=1:nCoeff

U((i+1),(3+j),1)= U(i,(3+j),1)+ T*((deltaJ(i))^(1))*deltaU(j);

end end infoTextBox1=
{'AberrationFile','CorrectionFile','MovementFile','rFitA','rFitC','rMax','Purtabation
Gain','CorrectionGain(T)','Iterations','RaidalOrderCorrected'};
infoTextBox2={abberationFilePath,correctionFilePath,movementFilePath,rFitA,
rFitC,rMax,Purta,T,run,cOrder};

info={'AberrationFile',abberationFilePath;'CorrectionFile',correctionFilePath;
'MovementFile',movementFilePath;...
    'rFitA',rFitA;'rFitC',rFitC;'rMax',rMax;...

'PurtabationGain',Purta;'CorrectionGain
(T)',T;'Iterations',run;'RaidalOrderCorrected',cOrder};

Figure(h1);
subplot(2,1,1);
plot(avelogVSX(:,1),'ro-');xlabel('run');ylabel('avelogVSX');

annotation('textbox',[0 0.5 0 0],'string',infoTextBox1)
annotation('textbox',[0.3 0.5 0 0],'string',infoTextBox2);

hold on;

xlswrite(outputFilePath,info,'Info','A1');
xlswrite(outputFilePath,U(:,:,1),'Corr','A1');
xlswrite(outputFilePath,avelogVSX(:,1),'avelogVSX','A1');
xlswrite(outputFilePath,ranArray,'ranArray','A1');
```

```
function [zernikes,rFit] = ReadZernikes(abberationFilePath)
zernikes = [];
rFit= [];
fileId = fopen(abberationFilePath,'r');
if fileId == -1, return ;end mode = 0;
zernikes = zeros(1,66);
while(1)
   thisLine = fgets(fileId);

if thisLine(1)=='#' if ~isempty(strfind(thisLine,'RFIT'))

spacePosition = strfind(thisLine,' ');

if ~isempty(spacePosition)

rmaxText = thisLine(spacePosition+1:end);

rFit = str2num(rmaxText);

end
      end continue
   else
      if isnumeric(thisLine) % end of file
         break
      else
         zernikeList = str2num(thisLine);
         if numel(zernikeList == 3)
            mode = mode+1;
            zernikes(mode) = zernikeList(3);
         else
            disp('Error reading Zernike file');
            return;
         end
      end
   end
end
```

FIG. 7G

METHOD AND ALGORITHM FOR DESIGNING CUSTOM OPTICS

CROSS-REFERENCE TO RELATED APPLICATIONS

This application is a continuation-in-part under 35 U.S.C. 120 of pending application U.S. Ser. No. 12/084,881, filed May 9, 2008, which is a national stage application under 35 U.S.C. 371 of international application PCT/US2006/043613, filed Nov. 9, 2006, now abandoned, which claims benefit of priority under 35 U.S.C. 119(e) of provisional application U.S. Ser. No. 60/734,823, filed Nov. 9, 2005.

FEDERAL FUNDING LEGEND

This invention was produced in part using funds obtained through National Institutes of Health grants NIH/NEI 5R01-EY019105, NIH/NEI 5R01 EY008520, NIH/NEI T32 EY07024 and NIH/NEI P30 EY007551 and through Navy subcontract NOO259-10-P-1354. Consequently, the federal government has certain rights in this invention.

BACKGROUND OF THE INVENTION

Field of the Invention

This present invention relates generally to the fields of custom optics and the manufacture thereof. More specifically, the present invention relates to algorithms for implementing a custom correction (termed herein intelligent correction) and manufacturing custom ophthalmic optics that particularly optimizes the optical design of a wavefront guided correction that accounts for registration errors between the correction and the underlying wavefront error on the eye.

Description of the Related Art

Standard ophthalmic optics only allow for the correction of a small subset of optical defects in the human eye, namely sphere, cylinder and prism. These defects are easily corrected and their correction provides adequate visual performance in the vast majority of normal subjects. However, there are visual advantages to correcting additional defects in the eye. These advantages are particularly well seen when dealing with eyes that have elevated levels of optical defects that can occur, for example, naturally, as a result of disease or as a result of surgical intervention on the eye or trauma to the eye.

For example, higher order ocular aberrations can significantly impact visual performance. While these higher order aberrations can be easily quantified, current contact lens designs do not provide an intelligent design philosophy that allows for the minimization of these aberrations and optimization of visual performance on an individual basis. The current state of the art lacks sensitive deployed methods to determine the impact of resulting residual aberrations on visual performance that occur due to misalignment, termed registration uncertainty, of the wavefront guided correction with respect to the underlying wavefront error of the eye.

Particularly, perfect alignment between the wavefront error (WFE) of the eye and a wavefront guided correction (WGC) that is designed to perfectly correct all of the eyes' WFE will provide the visual system with the best possible image for all pupil diameters. Unfortunately, for a variety of reasons well known to the industry, perfect registration of the correction with the underlying WFE is rare, if ever, achieved. Even if the WFE and the WGC can be measured and constructed perfectly and depending on the complexity of the wavefront error and the resulting WGC, registration errors of an ideal WGC can lead to retinal images that are worse than no correction. Registration errors can be static, e.g., with an onlay, inlay, refractive surgery, or dynamic, e.g., with a contact lens.

For example, a wavefront guided soft contact lens (WGSCL) or a wavefront guided scleral lens (WGSL) can provide better retinal image quality (RIQ), (1-3) comfort and longer wear time than a traditional gas permeable corneal contact lens. However, for a WGSCL or WGSL to provide optimal and stable RIQ, the WFE to be corrected must be measure accurately, the corrections must be implemented correctly and the correction must be well registered with the eye's wavefront error. In practice, the contact lens must move a small amount to maintain good ocular health. Movement of the correction, even if made perfectly, with respect to the underlying wavefront error causes variable residual aberrations, which variably degrades RIQ. The magnitude and variance of RIQ degradation is dependent on the magnitude of the underlying wavefront error, the design of the correction and the amount the correction's registration error.

Assuming that contact lens movement on the eye is Gaussian in nature and selecting a portion of individual aberration terms to correct instead of correcting all the aberration terms, report methods to design a correction consisting of partial correction of every aberration term to minimize the average variance of the residual wave-front aberration produced by Gaussian decentrations (translations and rotations) are reported (4-5). In the approach introduced by Guirao et al optimization does not take into the account the visual impact resulting from the interactions between aberration terms (6). Nor does it capitalize on metrics of image quality known to have a high correlation with measures of visual performance such as acuity. Further, the assumption that the movement and rotation of a contact lens on the eye was Gaussian in nature is far from true. How a contact lens, regardless of its design translates and rotates is highly dependent on contact lens designs, i.e., sphere, truncated or prism ballasted, toric, size, etc., lid geometry and tear flow (7-8).

Thus, there is a need in the art for improvements in the design philosophy of customized optics and methods of manufacturing the same given noise in measurements and registration uncertainty. That is, there is a need to improve actual performance using a metric of optical quality that is highly correlated with gains and losses in visual performance. Specifically, the prior art is deficient in methods to optimize the optical design of a wavefront guided correction to provide a specific level of gain in visual performance, e.g., acuity, within a user defined variation in the visual performance measure of interest given the anticipated alignment errors of the delivery system and the associated errors in measurement. The present invention fulfills this long-standing need and desire in the art.

SUMMARY OF THE INVENTION

The present invention is directed to a computer program product comprising a non-transitory computer-readable medium to store a computer readable algorithm which, when executed on a computer having at least a processor, a memory and a network connection, causes the computer to perform operations for optimizing a wavefront guided correction for a custom ophthalmic lens for an eye. The operations comprises receiving input comprising a quantified wavefront error of the eye, receiving input comprising a quantified registration uncertainty of the eye and identifying a metric that is predictive of a visual performance task of interest. A correction for the eye is determined based on the inputs and the predictive metric that provides a level of visual performance within a user-defined performance range. The present invention is directed to a related computer program product further comprising software tangibly stored on the computer readable medium which, when executed on the computer, causes the computer to perform operations for manufacturing the ophthalmic lens comprising the custom correction.

The present invention is directed further still to a method for optimizing a wavefront guided correction for a custom ophthalmic lens. The method comprises measuring a residual wavefront error of an eye and quantifying translational and rotational movements of a lens on or in the eye for each of a plurality of sequential images thereof obtained over time. Values for the residual wavefront error and for the quantified translational and rotational movements are inputted into an algorithm configured to determine an optimal wavefront guided correction therefrom and an optimal wavefront guided correction is outputted for the ophthalmic lens. The present invention is directed to a related method further comprising manufacturing the custom ophthalmic lens from the optimal wavefront guided correction.

The present invention is directed further still to an ophthalmic lens customized for a subject. The customized ophthalmic lens comprises the optimal wavefront guided correction outputted by the algorithm in the method described herein.

The present invention is directed further still to computer program products, tangibly embodied in the non-transitory computer readable medium described herein.

Other and further aspects, features, and advantages of the present invention will be apparent from the following description of the presently preferred embodiments of the invention. These embodiments are given for the purpose of disclosure.

BRIEF DESCRIPTION OF THE DRAWINGS

So that the matter in which the above-recited features, advantages and objects of the invention, as well as others which will become clear, are attained and can be understood in detail, more particular descriptions of the invention briefly summarized above may be had by reference to certain embodiments thereof which are illustrated in the appended drawings. These drawings form a part of the specification. It is to be noted, however, that the appended drawings illustrate preferred embodiments of the invention and therefore are not to be considered limiting in their scope.

FIG. 1 depicts the general algorithm useful for manufacturing custom optical corrections. Both image simulation and/or metrics (step 115) and intelligent correction (step 120) are integrated into this general algorithm.

FIGS. 2A-2C depict image simulations demonstrating how optical defects in the keratoconic eye reduce visual performance. FIG. 2A shows a perfect log MAR acuity chart. FIG. 2B shows a log MAR acuity chart that has undergone image simulation with the optical defects typical of the eye disease keratoconus. FIG. 2C shows a log MAR chart where specific (but not all) optical defects present in 2B have been corrected. In this sequence, image simulation has been used to determine which aberrations are most detrimental to visual performance, and must be corrected in a custom optic using the intelligent correction process.

FIGS. 7A-7G is a table containing the source code for the Stochastic Gradient Descent Algorithm or Optimizer algorithm on the optimization of Wavefront guided correction.

DETAILED DESCRIPTION OF THE INVENTION

Figure 3:
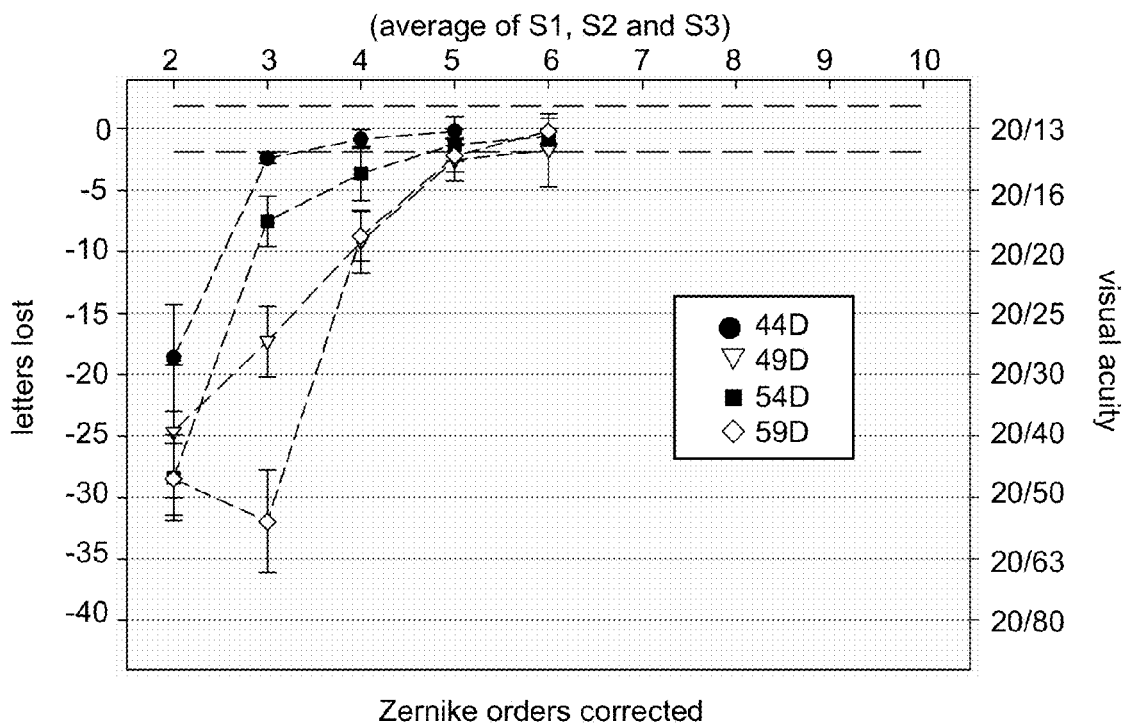
FIG. 3 shows results from image simulation of four keratoconus eyes. Visual performance is plotted on the ordinate and the complexity of the simulated correction represented as Zernike radial order is plotted on the abscissa. The point at which the data are equivalent to zero letters lost represents the point at which the simulated optic has returned visual performance to near normal levels. Here, this is equivalent to 20/13 visual acuity (better than 20/20). In this example this set of aberrations can then be passed to the algorithm for implementation in intelligent correction.

As used herein, the term "a" or "an" when used in conjunction with the term "comprising" in the claims and/or the specification may mean "one," but it is also consistent with the meaning of "one or more," "at least one," and "one or more than one." Some embodiments of the invention may consist of or consist essentially of one or more elements, method steps, and/or methods of the invention. It is contemplated that any method described herein can be implemented with respect to any other method described herein.

As used herein, the term "or" in the claims is used to mean "and/or" unless explicitly indicated to refer to alternatives only or the alternatives are mutually exclusive, although the disclosure supports a definition that refers to only alternatives and "and/or."

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure.

As used herein, the term "subject" refers to any recipient of the custom optical lenses designed and manufactured herein. Preferably, the subject is a mammal, more preferably the subject is a human.

As used herein, the term "image simulation" refers to the convolution of the point spread function resulting from the residual aberration structure of any given optical system, e.g., the eye plus correction.

As used herein, the term "intelligent correction" refers to a process using the closed-loop algorithm described herein to implement a specific optical correction to compensate for optical defects most deleterious to visual performance identified via image simulation and/or predictive metrics.

As used herein, the term "predictive metric" refers to any number of image quality metrics or visual performance metrics.

As used herein, the term "optimize" or "optimization" refers to a user defined predicted gain in the performance task, for an eye: acuity, area under the contrast sensitivity function, etc. Optimization has a user-defined limitation in the predicted variation of performance due to the registration uncertainty. That is because of the multi-dimensional space the search is operating in, one can never know if the absolute best correction is being located. Instead one searches until an acceptable optimized answer is found, i.e., a user defined average gain in predicted performance for the task of interest, for example, but not limited to, two lines of acuity, with an acceptable user defined variance, for example, a standard deviation of acuity of less than one line, given the registration uncertainty As used herein, the term "computer" generally includes: a processor, a memory, at least one information storage/retrieval apparatus such as, for example, a hard drive, a disk drive or a flash drive or memory stick, or other non-transitory computer readable media or non-transitory storage device, as is known in the art, at least one input apparatus such as, for example, a keyboard, a mouse, a point and touch device, a touch screen, or a microphone; and a display structure, such as the well-known computer screen. Additionally, the computer may include one or more network connections, such as wired or wireless connections. Such a computer or computer system may include more or less than what is listed above and encompasses other electronic media, as is known in the art, for example, but not limited to tablet computers or smart devices.

In one embodiment of the present invention there is provided a computer program product comprising a non-transitory computer-readable medium to store a computer readable algorithm which, when executed on a computer having at least a processor, a memory and a network connection, causes the computer to perform operations for optimizing a wavefront guided correction for a custom ophthalmic lens for an eye, comprising receiving input comprising a quantified wavefront error of the eye; receiving input comprising a quantified registration uncertainty of the eye; identifying a metric that is predictive of a visual performance task of interest; and determining a correction for the eye based on the inputs and the predictive metric that provides a level of visual performance within a user-defined performance range.

Further to this embodiment the computer program product comprises software tangibly stored on the computer readable medium which, when executed on the computer, causes the computer to perform operations for manufacturing the ophthalmic lens comprising the custom correction. In this further embodiment the custom ophthalmic lens may be an onlay lens, an inlay lens, an intraocular lens, or a contact lens.

In both embodiments the quantified wavefront error may comprise a residual wavefront error of the eye. Also in both embodiments the quantified registration uncertainty may comprise movement or placement error of a correction on or in the eye. Particularly, the quantified registration uncertainty may comprise error due to rotational movement or translational movement or both. In addition the metric may be log visual Strehl. Furthermore, the visual performance task of interest may comprise visual acuity, contrast sensitivity, face recognition, or plane recognition. Further still, the level of visual performance may be a best possible visual performance with a smallest standard deviation within the user-defined performance range.

In another further embodiment there is provided a method for optimizing a wavefront guided correction for a custom ophthalmic lens, comprising the steps of measuring a residual wavefront error of an eye; quantifying translational and rotational movements of a lens on the eye for each of a plurality of sequential images thereof obtained over time; inputting values for the residual wavefront error and for the quantified translational and rotational movements into an algorithm configured to determine an optimal wavefront guided correction therefrom; and outputting an optimal wavefront guided correction for the ophthalmic lens. Further to this embodiment the method comprises manufacturing the custom ophthalmic lens from the optimal wavefront guided correction.

In both embodiments the algorithm may be configured to enable instructions for calculating residual aberrations and a retinal image quality metric for each of the movements from the inputted values; and averaging retinal image quality across the plurality of movements. Also, the optimal wavefront guided correction is a combination of visual Strehl values measured at the lens position for each correction with a mean of log VS closest to zero and a smallest standard deviation. In addition, the optimal wavefront guided correction provides an optimal overall retinal image quality with minimal variation from movement of the lens on the eye. Furthermore, in both embodiments they a representative eye may be keratoconic.

In yet another further embodiment there is provided an ophthalmic lens customized for a subject comprising the optimal wavefront guided correction outputted by the algorithm in the method as described supra. In this embodiment, representative ophthalmic lenses may be an onlay lens, an inlay lens, an intraocular lens, or a contact lens.

In yet another embodiment of the present invention there is provided a method for manufacturing a customized optical lens, comprising a) identifying a minimal subset of optical aberrations present in an eye via image simulation, predictive metrics or a combination thereof, wherein correction of the optical aberrations maximizes visual performance of the eye; b) inputting physical values measured on the eye necessary to maximally stabilize an optical lens in a manner consistent with ocular health; c) integrating the minimal subset of aberrations via an algorithm designed to minimize the subset of aberrations with reference to the stabilization achieved in step b) as a custom-designed surface for the optical lens effective to maximize visual performance; and d) implementing construction of the custom surface onto the stabilized lens thereby manufacturing a customized optical lens.

Further to this embodiment the method may comprise evaluating or measuring the manufactured customized optical lens for optimal performance. In this further embodiment evaluating may comprise measuring the optical properties of the manufactured lens, resultant lens on-eye stability, residual aberrations, and resultant visual performance. Further still to this further embodiment the method may comprise modifying the optical lens design and iterating steps a) to d) to improve optimization.

In all these embodiments the eye may be a normal eye, may have a pathophysiological condition, may have a traumatic condition or an injurious condition or had a surgical procedure performed thereon. Examples of the specific condition may be keratoconus, corneal transplant, pellucid marginal degeneration, trauma, or poor refractive surgery outcome. The optical lens may be a contact lens, a spectacle lens, an intra-ocular lens, a corneal inlay, a corneal onlay, a benchtop optic or a phase retarder.

In yet another embodiment of the present invention there is provided an optical lens having a surface-customized correction for a minimal subset of optical aberrations maximally effecting visual performance constructed by a method comprising a) identifying a minimal subset of optical aberrations present in an eye via image simulation, predictive metrics or a combination thereof, where correction of the optical aberrations maximizes visual performance of the eye, b) inputting physical values measured on the eye necessary to maximally stabilize the optical lens in a manner consistent with ocular health c) integrating the minimal subset of aberrations via an algorithm designed to minimize the subset of aberrations with reference to the stabilization achieved in step b) as a custom-designed surface for the optical lens effective to maximize visual performance, and d) implementing construction of the custom surface onto the stabilized lens. In this embodiment the eye, including optical aberrations present therein and specific conditions, the predictive metrics and visual performance, and optical lenses are as described supra.

In yet another embodiment of the present invention there is provided a method of correcting optical aberration to improve visual performance, comprising manufacturing the customized optical lens described herein using a minimal subset of optical aberrations determined for the subject; and placing the customized optical lens on, in or in the path of the eye having the optical aberrations, thereby correcting or improving the visual acuity of a subject. In this embodiment the subject, the subject's eyes and the conditions thereof are as described supra. Also, in this embodiment the lens may be a contact lens, a spectacle lens, a phase retarder, an intraocular lens, a corneal inlay, or a corneal onlay.

In yet another embodiment of the present invention there is provided a computer program product having a memory that tangibly stores processor-executable instructions for performing a method for customizing the design and manufacture of an optical lens, said method comprising a) inputting physical values measured on the eye necessary to maximally stabilize an optical lens in a manner consistent with ocular health; b) integrating a minimal subset of aberrations present in an eye via an algorithm designed to minimize the subset of aberrations with reference to the stabilization achieved in step b) as a custom-designed surface for the optical lens effective to maximize visual performance; and c) implementing construction of the custom surface onto the stabilized lens. Further to this embodiment the method may comprise inputting modified values and iteratively repeating steps a) to c). In both embodiments the minimal subset of optical aberrations may be identified via image simulation, predictive metrics or a combination thereof. An example of predictive metrics may include retinal image quality metrics.

In yet another embodiment of the present invention there is provided a method for manufacturing a customized lens, comprising a) identifying a subset of optical aberrations; b) integrating the subset of aberrations via an algorithm designed to mimic the subset of aberrations as a custom designed surface for the optical lens; and c) implementing construction of the custom surface onto the lens thereby manufacturing a customized lens. Further to this embodiment the method comprises evaluating the manufactured customized lens for optimal performance.

Provided herein is a method utilizing an algorithm that allows the creation of custom optics. The algorithm identifies and seamlessly integrates the necessary design, manufacture and evaluation hardware, includes custom software that allows the generation of optics with custom optical zones and edge properties for specific applications and includes custom software that integrates manufacture components. The method is applicable to the design of any optical component, and in healthcare is most readily applicable to the design of customized ophthalmic optics.

The method provided herein comprises two processes. The first is a process for manufacturing optics. An algorithm is defined to identify and integrate the necessary design, manufacture and evaluation aspects of the methods. This algorithm specifies the generation of completely custom optics with full design control over the optical zone, peripheral zones, transition zones, edge properties, thickness characteristics and ballast properties, all of which can be modified for specific applications.

The second process guides the manufacture of the custom optics described above by identifying a correcting surface to be placed in the optic. It is demonstrated herein that correction of specific optical defects in the human eye can improve visual performance. Further, the optical defects can be determined for a given individual in order to maximize visual performance, truly customizing the process to the needs of the subject. The process of determining what optical defects are most important to visual performance is accomplished through image simulation or metrics, a process by which optical quality is simulated (image simulation) or predicted (metrics) allowing normal observers to either "see the world through an optically defective eye" or objectively evaluate optical quality using an appropriate metric. Given the optical defects, the closed loop algorithm is used to find the optical correction to compensate to best compensate such defects given the registration uncertainty between the correction and the underlying optical defects. This is "intelligent correction." This provides a process of manufacture that is truly customized respecting unavoidable constraints of the particular system one is correcting.

The myopic or near-sighted eye may be used as a non-limiting example to demonstrate the two processes. When a myopic eye views a visual target without the aid of spectacles, the image is blurred, and visual performance is reduced. However, when the myopic eye views a visual target with proper spectacles, the image formed on the retina is well-focused. This is because the spectacles compensate for the optical defect of the myopic eye. The correction in this case can be determined using conventional ophthalmic equipment, such as subjective refraction or an autorefractor, due to the simplicity of the optical defect.

The perception of the visual target for the myopic eye under uncorrected and corrected conditions described above can be demonstrated via image simulation. This would create two visual targets: one with blur (uncorrected case) and one with minimal blur (corrected case). These two visual targets are viewed by a well corrected, normal observer allowing them to "see the world as the myopic eye sees the world." Alternatively the uncorrected and corrected cases can be objectively evaluated using metrics.

However, when the defects of eyes become more complicated, as in keratoconus or post-refractive surgery, many permutations of correction may be needed to identify an optimal correction. Once a set of candidate corrections are identified, image simulation and the use of metrics allows for systematic evaluation of the corrections in a controlled environment. Once all candidate corrections are tested, the correction allowing for optimal visual performance is identified and is used as input into the design of an optical correction. Correction of a minimal subset of defects and/or a portion of a given set of aberrations determined from metrics instead of correction of all defects is desirable because the correction of all or even most of the aberrations often leads to stabilization requirements and/or manufacturing requirements that are impractical. The minimal subset provides the best possible vision with the greatest tolerance to decentration and rotation of the optic.

The methods and algorithms are useful to produce custom optics and to correct optical aberration in an optical system, including ophthalmic and non-ophthalmic systems. Ophthalmic optics may include, but are not limited to, contact lenses, phase retarders, spectacle lenses, intra-ocular lenses, corneal inlays, or corneal onlays. In addition, benchtop optics, phase retarders and other custom optics may be customized in a non-ophthalmic system. As such the present invention provides customized optical lenses designed and manufactured by the methods and processes described herein.

Generally, it is contemplated that customization may be specific for a single subject or may be a condition-specific customization, where it has been shown, for example, that in a specific eye disease or other condition the correction of certain aberrations typically results in good visual performance. Thus, these customized ophthalmic optics are useful to improve visual performance in subjects having normal eyes, a pathophysiological condition or a traumatic or an injurious condition of one or both eye or having had a surgical procedure performed on one or both eyes. Without being limiting, representative examples of such conditions may include keratoconus, corneal transplant, pellucid marginal degeneration, corneal trauma, or poor refractive surgery outcome. It is well within the purview of one of ordinary skill in the art to determine whether a subject is a candidate for customized ophthalmic optics as described herein or whether certain optical aberrations are commonly associated with specific disease states or post-surgical states of the eye.

Further still the present invention provides systems, devices, methods and algorithms to provide a wavefront guided ophthalmic lens optical solution for eyes with challenging optics. This is accomplished by applying algorithms to determine the optimal patient specific optical correction design by finding the optimal combinations of aberrations and magnitudes that provide the best overall retinal image quality with variation within user defined range given the actual measured movement of the contact lens on the eye. An optimization algorithm provides optimized magnitude wavefront guided correction is employed and is based on 1) a retinal image quality metric that is highly correlated with log MAR VA (visual Strehl ratio), 2) a series of measured data of contact lens on eye movement and 3) a goal that allows the optimized magnitude WGC at the end of the algorithm to achieve a specified level of visual performance with a given level of visual stability.

Utilizing the optimization algorithm resulted in optimized wavefront guided corrections that yield better overall retinal image quality than methods known in the art. Because of the highly predictive retinal image quality, these partial wavefront guided corrections not only improve retinal image quality but also visual acuity, which is a more widely clinically used approach to assess the visual performance, as the algorithm iterates the optimization process. Based on the measured lens movement, the partial wavefront guided corrections can improve the vision with the lens on the eye.

Thus, the present invention provides a non-transitory computer-readable medium embodied with the algorithm disclosed herein. As such, a computer program product tangibly embodied in the non-transitory computer-readable medium is also provided. Furthermore the present invention provides the source code for the stochastic parallel gradient descent algorithm (SPGD) or Optimizer algorithm in table format in the figures. Such computer program products and memories comprising the same are well-known and standard in the art. For example, the memory may be stored on a computer having a processor effective to perform the steps on the stored memory. Alternatively, the memory may comprise a computer diskette or memory stick or other hard storage media as are well-known in the art.

General Implementation of Intelligent Correction

1. The process starts by inputting the wavefront error (WFE) to be corrected, the registration uncertainty between the correction and a starting correction into a search algorithm Typically the starting correction is a full correction of the underlying WFE using the minimum number of terms necessary to restore a normal level of image quality.

2. The residual aberrations resulting from each sampled registration error is reduced to a single value metric of image quality that is highly correlated to the performance task of interest, e.g., acuity, plane detection, face identification, area under the contrast sensitivity function) and the average value of the metric and its variance calculated for this starting correction.

3. Because of the number dimensions involved and the resulting complexity of the correction space being explored, a search method which can efficiently converge to an acceptable answer within this space is employed, e.g. stochastic parallel gradient descent, automated annealing.

The following example(s) are given for the purpose of illustrating various embodiments of the invention and are not meant to limit the present invention in any fashion.

Example 1

Lens Manufacture Algorithm

The first component of the method described herein is an algorithm by which custom optics can be designed and manufactured. This algorithm can be used to design and manufacture contact lenses for any individual for which contact lenses are clinically indicated. The algorithm is depicted in FIG. 1.

The process begins at step 100 in a manner similar to conventional lens dispensation, i.e., the subject is evaluated by a clinician. If the subject is deemed a candidate for contact lens wear, contact lens parameters such as lens base curves, diameter, prism ballast, and power are determined and are iterated until a rotationally and translationally stable lens is achieved at step 105. In order to facilitate customization of the lens to the subject's optical defects, a full description of the optical defects of the eye(s) is quantified at step 110 with the stabilized lens on and off.

At step 115 a minimal subset of the residual optical defects (lens/eye system) which are most deleterious to visual performance is identified through image simulation and/or the use of metrics. This subset is integrated with the lens parameters, such as base curves, diameter, prism ballast, edge properties, thickness, etc. in defining the custom surface of the optic at step 120. This surface is interpreted and produced by a manufacturing tool such as a diamond turning lathe or other system capable of implementing the custom correction at step 125. The lens is evaluated to assure correct and accurate manufacture at step 130. The lens is sterilized, marked for orientation and packaged according to all applicable laws and regulations at step 135. The on-eye lens performance is evaluated, including lens comfort and movement at step 140 and visual performance is evaluated at step 145.

The total performance of the lens-eye system is evaluated at step 150 if the exit criteria is met, the process ends at step 155. Otherwise an iteration modifying the lens is initiated at step 105. If lens is stable no changes are made and step 110 is initiated and the loop repeated until exit criterion is reached. Exit criterion is subject specific.

Example 2

Description of Optical Defects

The implementation of custom ophthalmic optics used herein is determined by wavefront sensing. Wavefront sensors can determine the optical error, also referred to as optical defects or aberrations, present in an eye. Currently, the Zernike expansion is the ANSI standard (ANSI Z80.28) fitting function for describing ocular wavefront error, and is used here to describe optical aberration. The Zernike expansion is a long-established method for defining optical errors and is not unique to the eye and is not necessary to the methods being described. Any mathematical method could be used that adequately defines the optical defects of the eye. The Zernike expansion is used herein for illustrative purposes and because it is the national standard established for describing ocular wavefront error.

Example 3

Image Simulation

FIGS. 2A-2C demonstrate the process of image simulation. FIG. 2A shows a non-blurred visual target. FIGS. 2B and 2C show targets that are blurred using image simulation. The process used to form a blurred image is convolution.

First, the eye's aberrations are used to define a point spread function. This function describes the spatial distribution of a point of light after having been imaged by an optical system. Second, the point spread function is applied to the larger image, which is constructed from a finite number of point sources. The summed impact of distortions caused by the point spread function on all points in the image is seen as the blurred visual target.

The optical defects used to blur the chart in FIG. 2B provide an idea of how aberrations impact visual performance. FIG. 2C shows a visual target where a subset, but not the complete set, of the optical defects used to blur the image in 2B has been corrected. Note that FIG. 2C is similar in appearance to 2A, demonstrating that the aberrations which remain uncorrected have minimal impact on this measure of visual performance. Other measures of visual performance important to a particular subject could be used in place of a high contrast high luminance visual acuity chart, e.g., face recognition, low contrast acuity, contrast sensitivity, etc. Alternatively, instead of image simulation, metrics can be used to objectively quantify optical quality.

Thus, image simulation and/or metrics are used to identify the minimum set of aberrations that can be used in intelligent correction to produce optics. Correcting the minimum number of aberrations that provide the best possible vision reduces the constraints for perfect alignment making the correction feasible in the real world environments where perfect alignment regardless of the method of correction is not always practical or achievable.

FIG. 3 shows data obtained from experiments using the image simulation process on four keratoconic eyes (individual traces). In this implementation of image simulation, individuals with normal vision are reading letter charts that have been aberrated with the defects of four keratoconic subjects. In this example abscissa plots the Zernike expansion orders that have been corrected. Moving left to right, the correction becomes more inclusive and complete, in that more of the aberration terms are incorporated into the correction. The ordinate plots visual performance. Each data point represents the visual performance for normal individuals reading letter charts aberrated to simulate keratoconic vision.

When the data points return to an ordinate value approaching zero letters lost, the correction is optimized in this example, meaning that the subset of Zernike modes chosen for correction is sufficient to return visual acuity to normal levels and the aberration components that remain uncorrected have minimal to no effect on visual performance. In this example, the 44D eye contains the least amount of optical defects in the group and the 59D contains the most defects in the group. This data, recorded through the use of image simulation, predicts that correction of aberration through the $5^{th}$ or $6^{th}$ Zernike radial order returns vision to normal levels for these subjects. With the identification of what aberrations are detrimental to visual acuity, this information can be used as input to guide the manufacture of custom optics through the intelligent correction process (FIG. 1). Correcting the minimal set of aberrations reduces the alignment constraints of the correcting optics, increasing the probability of successfully providing the subject with a useful correction.

Example 4

Image Simulation and Intelligent Correction in a Keratoconus Subject

Figure 4:
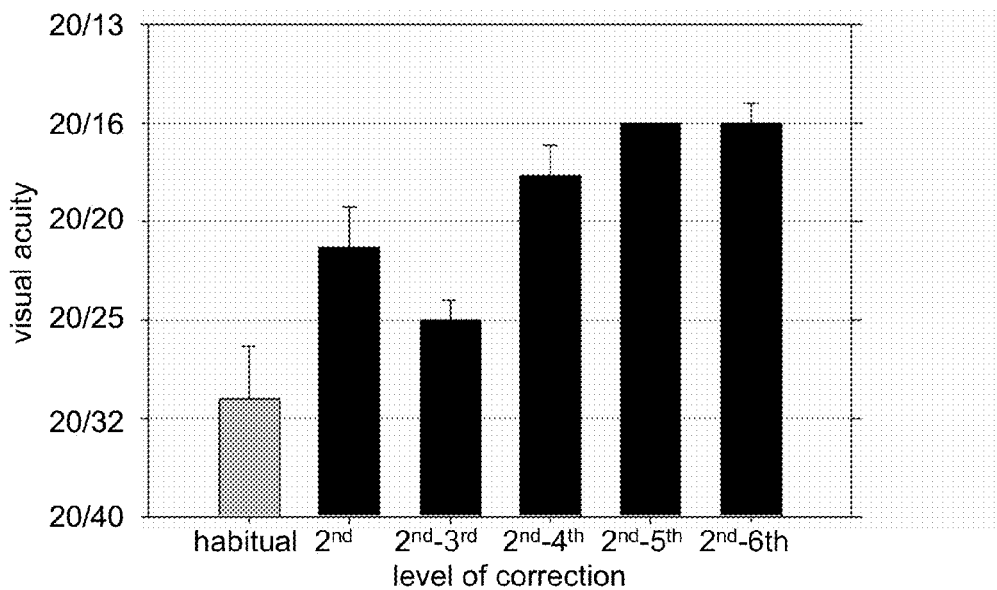
FIG. 4 shows high contrast log MAR visual acuity data for a keratoconic eye viewing letters through a series of increasingly complete custom corrections implemented in the form of phase plates. Habitual contact lens acuity is shown with grey bars. Custom optical corrections ranging from $2^{nd}$ Zernike order to $2^{nd}$-$6^{th}$ Zernike order corrections are shown with black bars. This implementation of intelligent correction predicted that this subject would see best with a $2^{nd}$-$5^{th}$ order correction and that increasing the number of aberrations corrected provides no further benefit. As can be seen in this example, visual performance was maximized with a $2^{nd}$-$5^{th}$ order intelligent design correction. Correcting more aberrations put unnecessary constraints on the design, manufacturing and stability of such corrections.

Results obtained for a subject who has been corrected with custom optics designed according to the method described in this disclosure are shown in FIG. 4. The keratoconic subject being tested in FIG. 4 was viewing unblurred letter charts through phase retarders (black bars) designed from image simulation and intelligent correction. The results are compared to habitual contact lens correction (grey bar). The results demonstrate visual acuity for increasingly complex corrections under high contrast and high luminance viewing conditions. According to FIG. 3, image simulation predicts optimal results at $5^{th}$ order correction, which is seen with custom lenses in FIG. 4. The data demonstrates the ability of the method to be used to identify and implement optimized custom corrections and shows an improvement when compared to the habitual correction.

Example 5

Contact Lens Movement Monitor

Figure 5A:
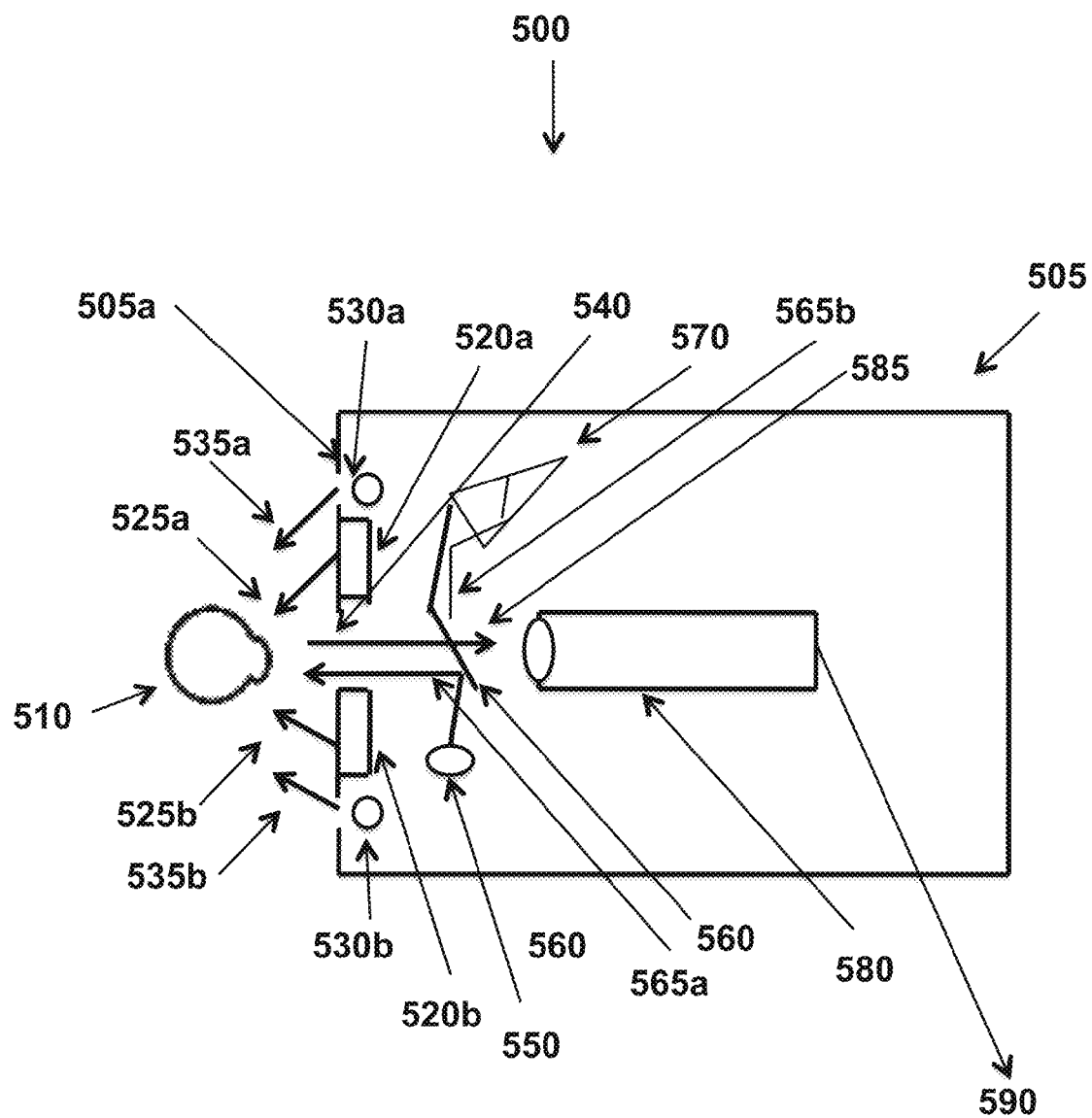
FIGS. 5A-5B depict the contact lens movement monitor (FIG. 5A) and a representative frame captured by the monitor (FIG. 5B).

FIG. 5A show the contact lens movement monitor 500. The contact lens monitor measures the contact lens movement, i.e., translation and rotation, with respect to the center of the pupil, of a predicate, trial or test lens. The monitor comprises a housing or enclosure 505 that houses the components of the monitor. The housing has a front side 505a comprising a viewing aperture 540, a first pair of apertures 525a,b through which non-visible, for example, infrared, light is transmitted to the eye and a second pair of apertures 535a,b, through which visible, for example, white light is transmitted to the eye. The monitor comprises two infrared light sources 520a,b and two white light sources 530a,b to provide illumination of the eye with contact lens 510. To achieve uniform illumination of the eye the light sources are positioned on either side of the viewing aperture 540. The infrared light provided through apertures 525a,b allows the investigator to monitor the pupil size and location in the "dark". The white light illumination can be varied through apertures 535a,b thereby inducing changes in pupil diameter, if so desired. The luminance of the white light and infrared light sources are individually adjustable.

A fixation light 550 emits light that is reflected by a mirror 560 at 565a to help the subject maintain fixation during primary gaze experiments. A dark box 770 absorbs any light from the fixation source at 575 that is not reflected and penetrates the mirror at 565b to reduce light noise within the enclosure. A CCD camera 580 captures the eye and lens movement at 585 at selectable frame rates. The captured images or frames and other relevant data are transmitted electronically and received by a computing device 590, such as a computer having at least a memory, a processor and at least one network connection and the software and/or algorithms comprising, but not limited to, processor executable instructions for marking the lens, tracking the lens movement, such as rotational and translational movement, with respect to the center of the pupil, quantifying the rotational and translational movement.

The contact lens monitor is configured to capture contact lens translations ranging ±3 mm with a precision of ±0.016 mm at each location and a rotations ±over a range of more than 20 degrees, depending on the diameter of the lens and lid position, with a precision of ±0.07 degrees. For a contact lens with a larger diameter, the precision of measurement increases. The contact lens movement monitor is capable of capturing images at a selectable sampling rate between 0 and 15 Hz.

Figure 5B:
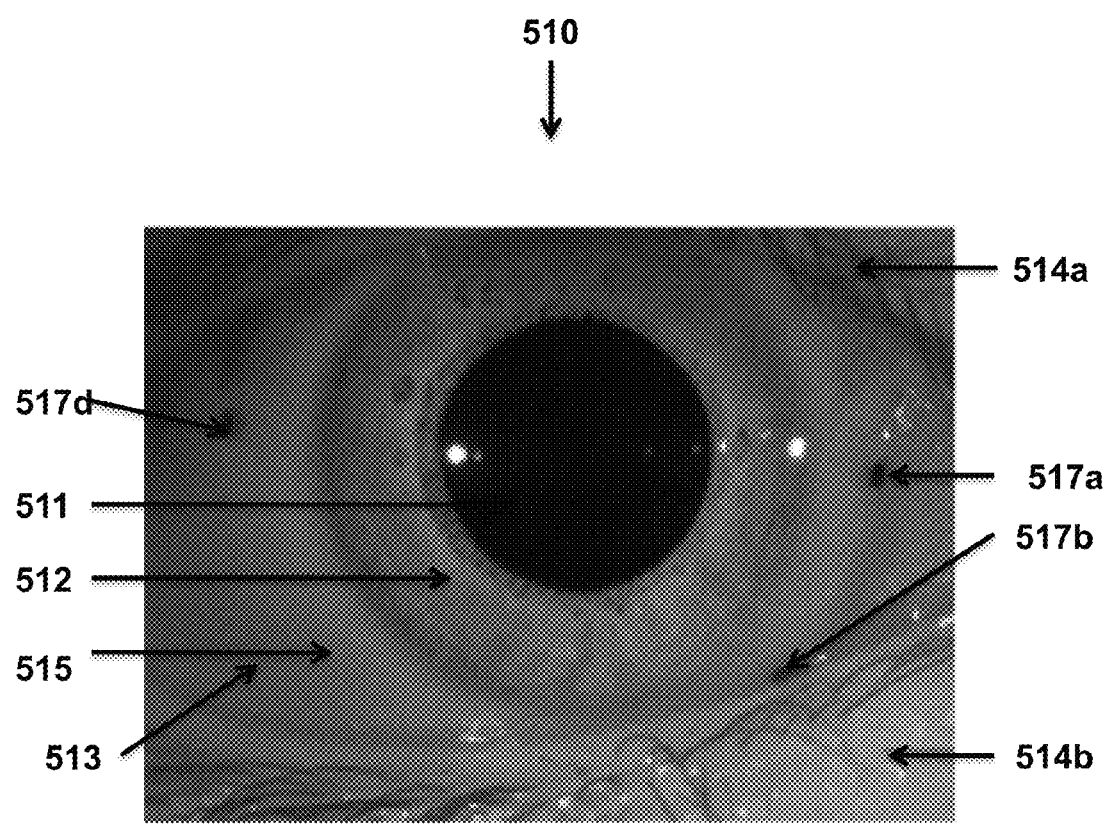

FIG. 5B shows an image of the eye 510 captured by the contact lens movement monitor. The parts of the eye are clearly illustrated, showing the pupil 511, the iris 512, the conjunctiva 513 and the upper 514a and lower 514b eyelid and lashes. The contact lens 515 is marked at its edge at positions 517a,b,c. The contact lens marks 517a,b,d, positioned at 3, 5 and 9 o'clock, are utilized to assist in monitoring lens movement. The contact lens is marked precisely with a DAC lathe at 3, 5, 6, 9, and 12 o'clock at a fixed distance from the edge of the lens. The 6 and 12 o'clock marks 517c,e are hidden by the eyelids. The small lathed marks are then filled with ink for improved visibility and detection. The marks shown herein at 3, 5 and 9 o'clock correspond to the ideal position for the lens.

Contact Lens Movement Tracking Software

To quantify the lens movement with respect to the pupil center a novel image processing program AutoLensTracker the lens center and monitors rotation and translation of the contact lens with respect to the pupil center in a semi-automated manner. After a series of images are captured by the contact lens movement monitor, the images are analyzed by AutoLensTracker software. The pupil center, the positions of the contact lens marks and the limbus center are determined by the program. The translation and rotation of the contact lens are calculated based on the position of the lens marks and pupil center. The movement profile is recorded, for example, in an Excel file, showing the image frame file name, the horizontal translation, x move, in mm, the vertical translation, y move, in mm and the rotation, theta move, in degrees.

Figure 6A:
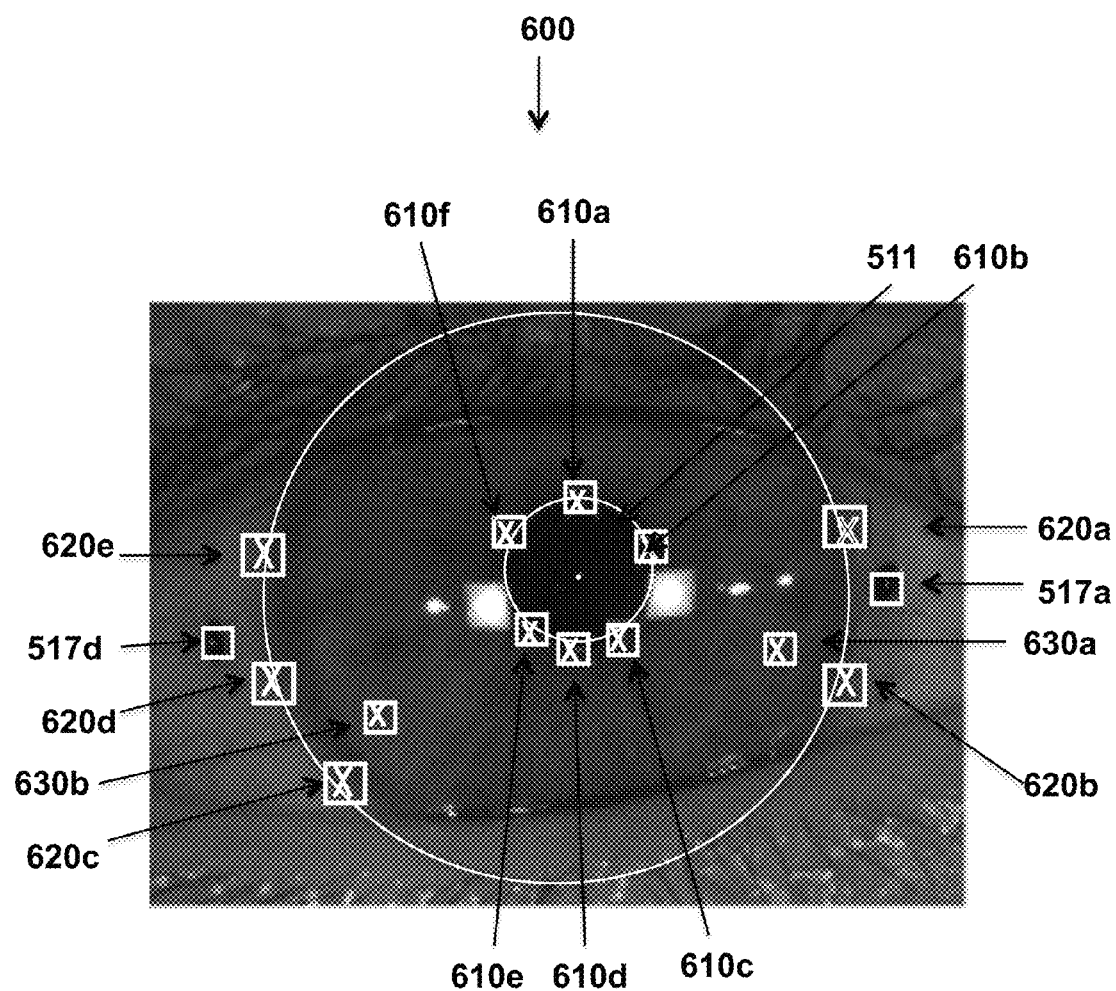
FIGS. 6A-6B depict representative images during analysis (FIG. 6A) and calculation (FIG. 6B) of contact lens movement.

FIG. 6A illustrates the analytic function 600 of the contact lens movement on the eye. The program AutoLensTracker is configured to enable an operator to locate 6 regions of interest (ROI) 610a,b,c,d,e,f, shown as colored, e.g., purple, boxes, on the edge of the pupil 511 using a drag and drop procedure. The center of these 6 boxes are fit with an ellipse using a least squares analysis. The center of the ellipse defines the pupil center. These 6 boxes are located automatically in the next and subsequent images by cross-correlation of the regions of interest. The operator can pause the automatic procedure at any time and adjust the box(es) position, if any box is not properly located on the pupil edge.

Similarly, the program AutoLensTracker is configured to enable an operator to locate 5 boxes 620a,b,c,d,e, shown as colored, e.g., blue, boxes, to determine the limbus center. As with the pupil finding algorithm, each box is initially positioned by the operator and subsequent box locations are found by cross correlation of the regions of interest. The operator also positions 2 boxes 630a,b, shown as colored, e.g., red, boxes, to track the position of the 2 lens marks 517a,d 180 degrees apart. Once all boxes are initially positioned on the first image, the program will cross-correlate the region of interest with the next image and output the positions of lens marks in each image in a file for later analysis.

Figure 6B:
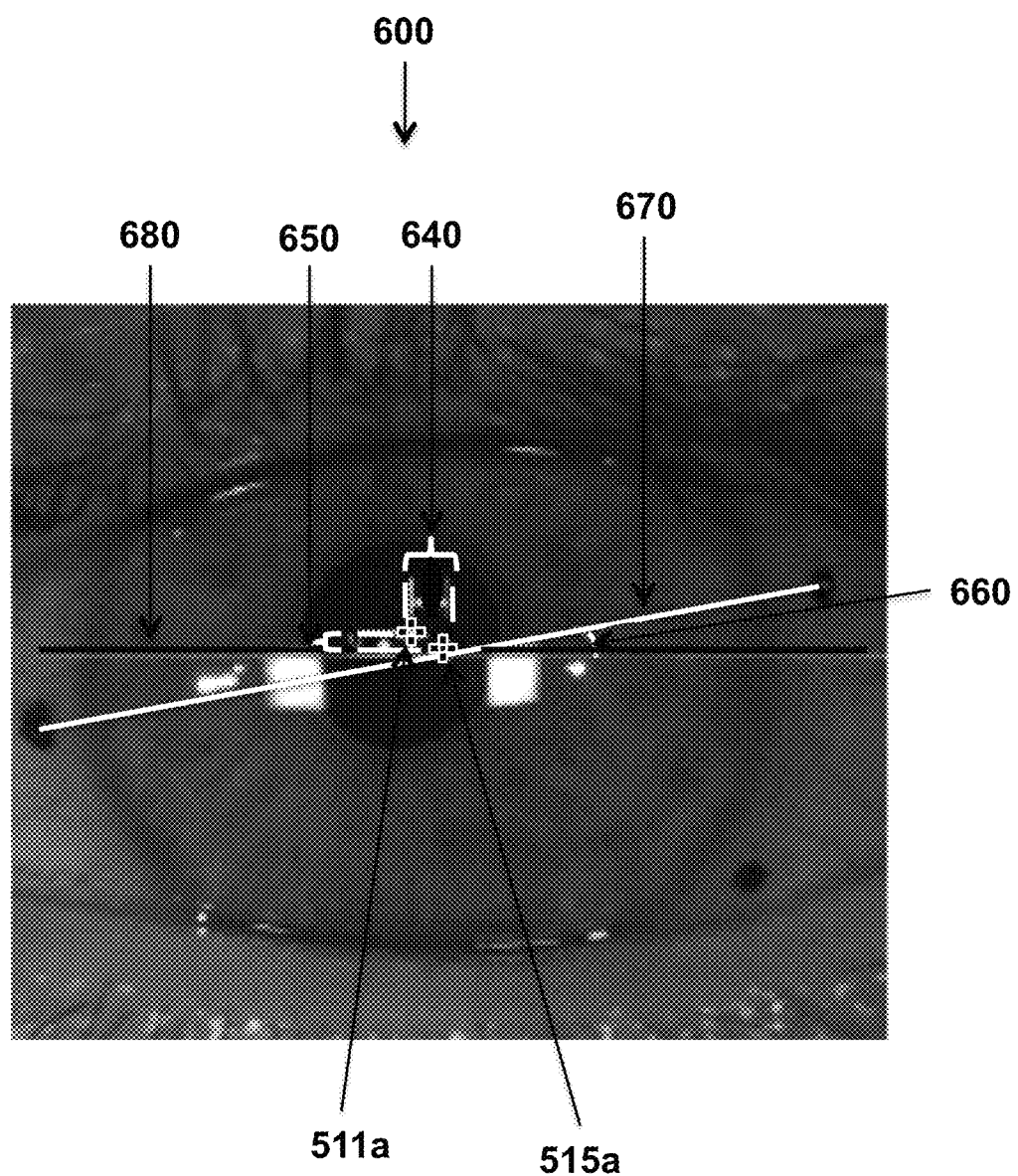

FIG. 6B illustrates the calculation function of the AutoLensTracker program. The origin of the coordinate system is the pupil center. Lens movement in X and Y directions are calculated as horizontal 640 and vertical 650 Cartesian distances between pupil center 511a, displayed as a green cross on a display screen, and the lens center 515a, displayed as a red cross. Lens rotation θ 660 is calculated as the angle between the line connecting the two lens marks and camera horizontal. Rotations counter clockwise are positive. The line 670, displayed as red on a display screen, connects the centers of the lens marks and the middle point of the red line is defined as the contact lens center 515a. Horizontal displacement from cross 511a to cross 515a is the contact lens horizontal movement X and the vertical displacement from the cross 511a to the cross 515a is the contact lens vertical movement Y. Rotation θ 660 is measured in degrees from the horizontal line 680, displayed as a blue line on a display screen.

Example 6

Optimized Partial Wavefront Guided Corrections
Optimizer Algorithm

The source code for the stochastic parallel gradient descent algorithm (SPGD) or Optimizer algorithm is depicted in the tables 700a-700g in FIGS. 7A-7G.

Optimization Process

Figure 8:
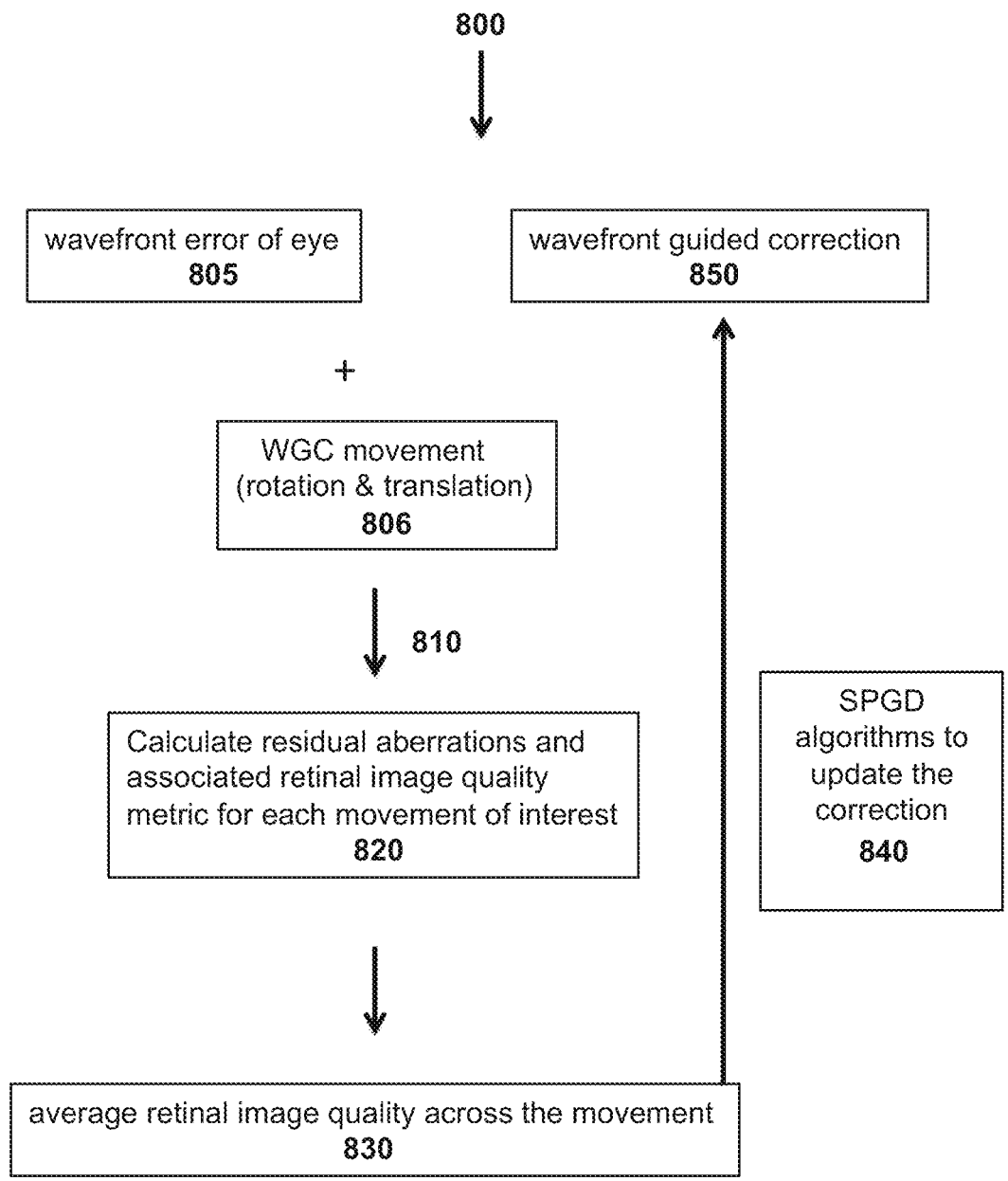
FIG. 8 illustrates the optimization procedure.

The optimization procedure 800 is illustrated in FIG. 8. Generally, at 810, the residual wavefront error 805 of the eye, which was determined with a predicate lens in place, and the calculated translation and rotation values for WGC movement 806 are inputted into the algorithm at 810. Residual aberrations and an associated retinal image quality metric for each movement of the predicate lens of interest are calculated at 820. The retinal image quality across the movement is averaged at 830. At 840 the stochastic parallel gradient descent algorithm (SPGD) or Optimizer algorithm determines the optimal wavefront guided correction 850 from the residual wavefront error and the retinal image quality to update or optimize the correction via, in one example, but not limited to $$\Delta J_k = J(u^k)J(u^{k-1}),\qquad \text{Eq. 1}$$

and $$u_i^{k+1} = u_i^k + \Gamma \delta J^k \delta u_i^k,\qquad \text{Eq. 2}$$

where k is the iteration of optimization; J is the averaged retinal image quality in each iteration; u is the wavefront guided correction Zernike coefficient array; Γ is the correction gain, which determines the steepness of the retinal image quality improvement curve; δu is the perturbation from the last iteration.

The criterion for the retinal image quality (RIQ) metric uses, for example, log visual Strehl because of its high correlation with log MAR visual acuity (8-10). The log visual Strehl is defined as:

$$\log VSX = \log \frac{\int PSF(x,y)N(x,y)dxdy}{\int PSF_{DL}(x,y)N(x,y)dxdy},\qquad \text{Eq. 3}$$

where VSX is the visual Strehl ratio calculated in the spatial domain, PSF is the point spread function, DL is diffraction limited, and N is the neural weighting function and its correlation with log MAR acuity is defined as:

$$\Delta\text{acuity}=-0.4219\times\log VSX-0.0975 (R2=0.944)\qquad \text{Eq. 4}$$

The SPGD algorithm is configured to modify the $2^{nd}$ through $4^{th}$ radial order correction such that it provides better retinal image quality and predicted acuity given the allowed movement.

Example 7

Demonstration of Optimization Process: Retinal Image Quality
Input Parameters

Wavefront Error: The wavefront error measurements were obtained over a 5 mm pupil of 3 mild and 3 moderate keratoconic (KC) eyes randomly selected from a database for modeling of the optimization process.

Movement of the correction with respect to the wavefront error: A simple discrete 3 point rotation misalignment of the correction was used to verify the model comprising 5 degrees counterclockwise, 0 degrees and 5 degrees clockwise.

Two critical parameters include perturbation gain, which determines the step size of the random number generated in the algorithm (ξu), and Γ, which determines the steepness of the log VSX improvement curve. Both are determined experimentally.

Starting correction: a $2^{nd}$ through $4^{th}$ radial order full magnitude correction.

Figure 9A:
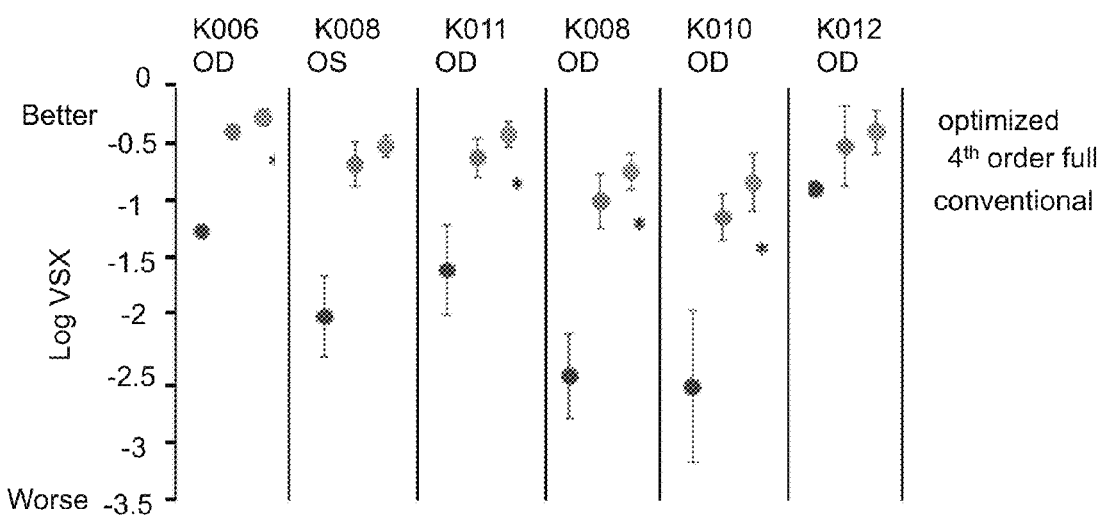
FIGS. 9A-9B illustrate retinal image quality (FIG. 9A) and predicted visual acuity improvement (FIG. 9B) of SPGD optimized, full magnitude and conventional corrections in 6 KC eyes. Significant improvement in paired t test ($P<0.05$).
Figure 9B:
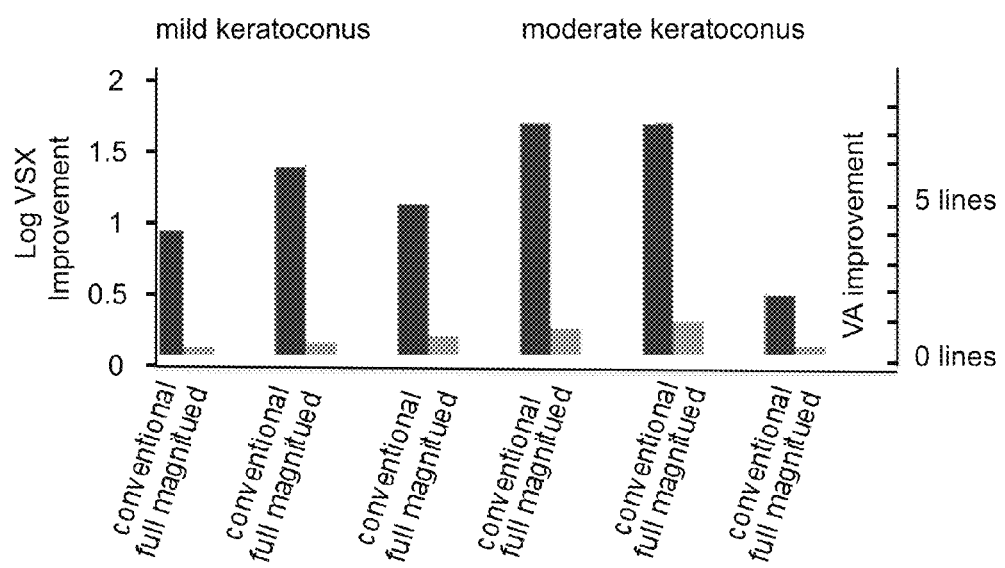

The retinal image quality resulting from 3 corrections on each of the 6 keratoconic eyes is shown in FIG. 9A. The $4^{th}$ order optimized corrections obtain significant retinal image quality improvement over the full magnitude correction 4 out of 6 keratoconic eyes. The standard deviation of the retinal image quality obtained by the optimized corrections are less than one line of predicted acuity in all of the 6 eyes. The retinal image quality and visual acuity improvement of optimized correction over conventional correction, i.e., sphere and cylinder, and full magnitude correction is shown in FIG. 9B. In 3 out of the 6 keratoconic eyes, optimized corrections obtain VA improvement of 5 lines over the conventional correction and 1 line over full magnitude correction, respectively. The SPGD algorithm provided an average of 5.20±1.06 and 5.77±3.15 lines improvement in predicted log MAR acuity over the conventional corrections for 3 mild eyes and 3 moderate eyes, respectively, and 0.68±0.18 and 0.98±0.40 lines of improvement in predicted log MAR acuity over the $4^{th}$ order full magnitude corrections.

Example 8

Demonstration of Optimization Process: Measurements of the Contact Lens Movement Input Parameters Wavefront error: WFE was measured on one keratoconic eye with a 7 mm pupil through a VOI scleral contact lens fitting set.

Contact lens movement: VOI scleral trial lens movement on a keratoconic eye was recorded at 5 minute intervals over one hour on 5 days.

Retinal image quality: Log VS was computed over a 5 mm pupil.

Two critical parameters include perturbation gain, which determines the step size of the random number generated in the algorithm (ξu) and Γ which determines the steepness of the log VSX improvement curve. Both are determined experimentally.

The starting wavefront guided correction is a $2^{nd}$ through $4^{th}$ radial order full magnitude correction.

Figure 10A:
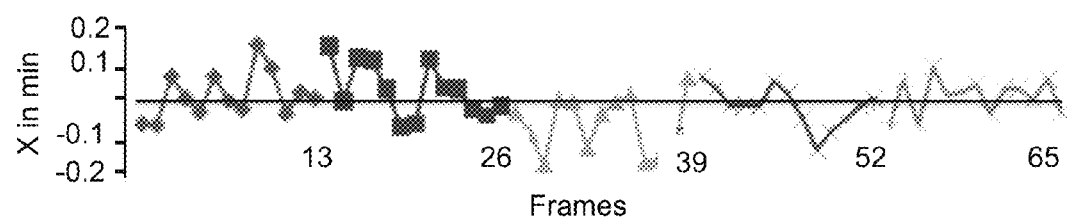
FIGS. 10A-10C illustrate contact lens movement in horizontal translation x (FIG. 10A), vertical translation y (FIG. 10B) and rotation theta (FIG. 10C) with respect to the underlying wavefront error sampled in 5 days, each day one hour in 5 minute intervals. Data is grouped by different days.
Figure 10B:
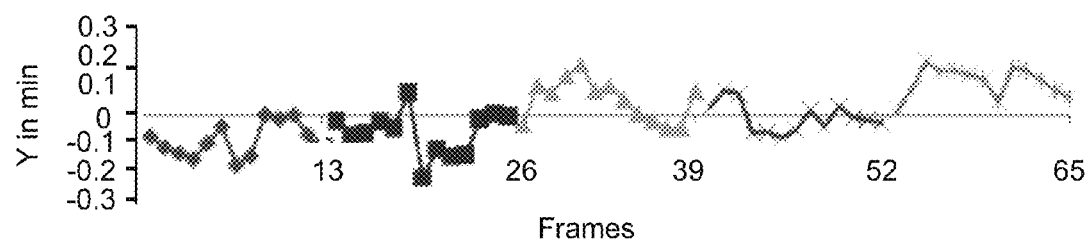
Figure 10C:
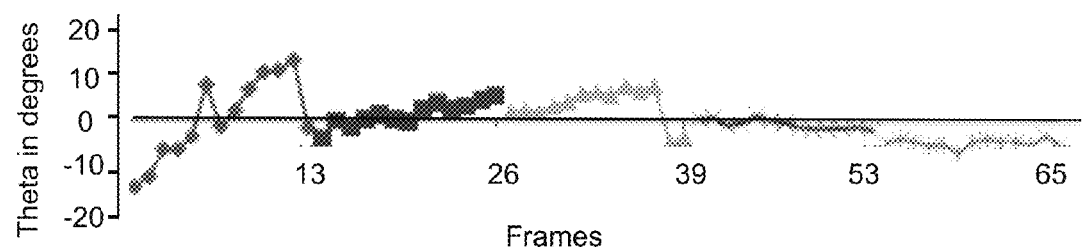

The movement of a fitted scleral contact lens with respect to the pupil center was measured on one of the keratoconic eyes. The lens movement was measured every 5 minutes for an hour and repeated over 5 days, which yield 13*5=65 movement frames. In order to record the lens movement accurately, the scleral contact lens which fitted the KC eye was marked at 3, 5, 6, 9 and 12 clock. The eye was allowed to adapt to the lens for 10 minutes before recording. The images of the lens on the eye were recorded with the custom-designed camera system described supra and were analyzed with the custom program described supra, which breaks down each movement frame into 3 components: horizontal translation, vertical translation and rotations. The recorded lens movement data is shown in FIGS. 10A-10C.

Figure 11:
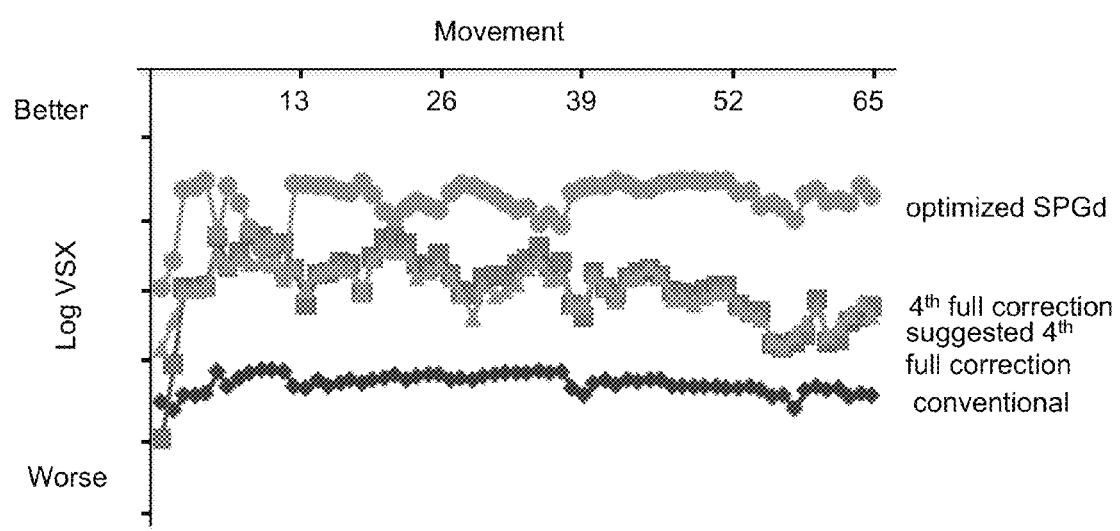
FIG. 11 illustrates log VSX as a function of movement for 4 corrections.

FIG. 11 compares simulated performance for corrections derived from conventional correction, a $4^{th}$ order full magnitude correction, a $4^{th}$ order full magnitude suggested correction (Guirao) and a $4^{th}$ order full magnitude SPGD correction. The simulation derived from the method described herein, with the log VSX consistently performs better.

Example 9

Verification of the Optimization Model
Measurement of Subject's Wavefront Error (WFE)

The subjects were free of systemic and ocular pathology with best corrected distance visual acuity better than 20/20. For each subject, the eye with better acuity was dilated with 1% cyclopentolate hydrochloride to paralyze accommodation and best corrected via a subjective refraction through a 3 mm artificial pupil. Each subject's dilated WFE was measured 5 times using a Shack-Hartmann wavefront sensor while wearing their best cycloplegic spectacle correction. Each measured WFE was fit with a normalized Zernike expansion (ANSI-28-2004) through the 10th radial order over a 3 mm pupil and averaged. The average of the 10 measurements for each subject was taken as the best estimate of the test eye's best corrected WFE over a 3 mm pupil and used for the pre-compensation procedure described below.

Wavefront Errors of Interest

The wavefront errors of interest for validating the model where selected from the residual errors used to generate the log VSX maps of FIGS. 12A-12F and 13. Previous work (9) has demonstrated that a change in log VSX of approximately 0.3 induces a change of acuity of approximately 1.4 lines. The residual WFEs were sampled at 5 levels of log VSX by percentile (10%, 25%, 50%, 75%, 90%) in each correction as indicated in FIGS. 13E-13F and 14 as the enlarged data points.

Generation of Pre-Compensated "Blurred" Log MAR Acuity Charts

The residual aberration of each subject was pre-compensated by pre-emphasizing (11-12) the optical transfer function (OTF) of each residual WFE with each subject eye's best corrected OTF over a 3 mm pupil as defined in:

$$\text{Pre-emphasized } OTF = \frac{OTF \text{ (residual } WFE)}{OTF \text{ (3 mm)}}, \quad \text{Eq. 5}$$

where OTF (residual WFE)=the optical transfer function (OTF) calculated from each residual WFE of interest and OTF (3 mm)=the optical transfer function (OTF) over a 3 mm pupil with best cycloplegic spectacle correction of the viewing subject calculated from the subject's average WFE over a 3 mm pupil.

Eleven-line log MAR acuity charts (0.7 to −0.3 log MAR) with British standard letters of 30% contrast were generated using Visual Optics Laboratory Professional software (version 6.89, Sarver & Associates, Inc.). For each of the 25 residual aberrations and 1 unaberrated test condition 3 unique acuity charts were simulated after pre-compensating for the aberrations of each subject over 3 mm pupil, yielding 63 unique log MAR simulations for each of the KC eyes. There were 63*3=189 charts read by each normal subject.

Measurement of Acuity

The log MAR acuity charts were displayed on a gamma-corrected monochromatic, high resolution (Totoku M253i2, 1200*1600 pixels) LCD monitor. Each of the 189 charts was displayed randomly through a custom MatLab program using psychtoolbox (17). The subjects viewed the charts displayed on the monitor through a 3 mm artificial pupil along with their best-corrected sphero-cylindrical prescription at a distance of 12.2 feet. The subject read the letters on the chart starting on the lowest line where all letters could be read correctly and continuing until 5 letters were missed. Subjects were given credit for all letters read correctly up to the 5th miss. The data for each subject were normalized to the subject's mean log MAR acuity as measured on an unaberrated log MAR acuity chart such that positive changes indicate a change to poorer acuity and negative changes indicate a better acuity.

Example 10

Retinal Image Quality and Visual Acuity with SPGD Algorithm Based Corrections

The SPGD algorithm was used to optimize the partial magnitude correction for 3 keratoconic eyes, based on measured habitual scleral contact lens movement. The retinal image quality metric log Visual Strehl was used as a predictor of visual acuity outcome. The visual acuity outcome of the optimized corrections were validated by regressing measured acuity loss from subjects viewing acuity charts that were degraded by the residual WFE resulting for the wavefront guided correction movement against the predicted acuity. The visual acuity outcomes of the optimized corrections were compared with those of full magnitude corrections and previously studied partial corrections.

More particularly SPGD optimization was based on 1) the retinal image quality metric log visual Strehl, which is proved to be highly correlated with visual acuity and the measured frame by frame contact lens movement, instead of the standard deviation of the movement, which was assumed to have an ideal Gaussian distribution. For the 3 keratoconic eyes, comparisons of the retinal image quality log visual Strehl and the measured log MAR visual acuity resulting from prior suggested corrections (Guirao) and the optimized correction change with the contact lens movement. The retinal image quality and VA from the conventional correction (2nd order full magnitude) and full magnitude 2nd to 4th order correction were plotted as well for the purpose of reference.

Figure 12A:
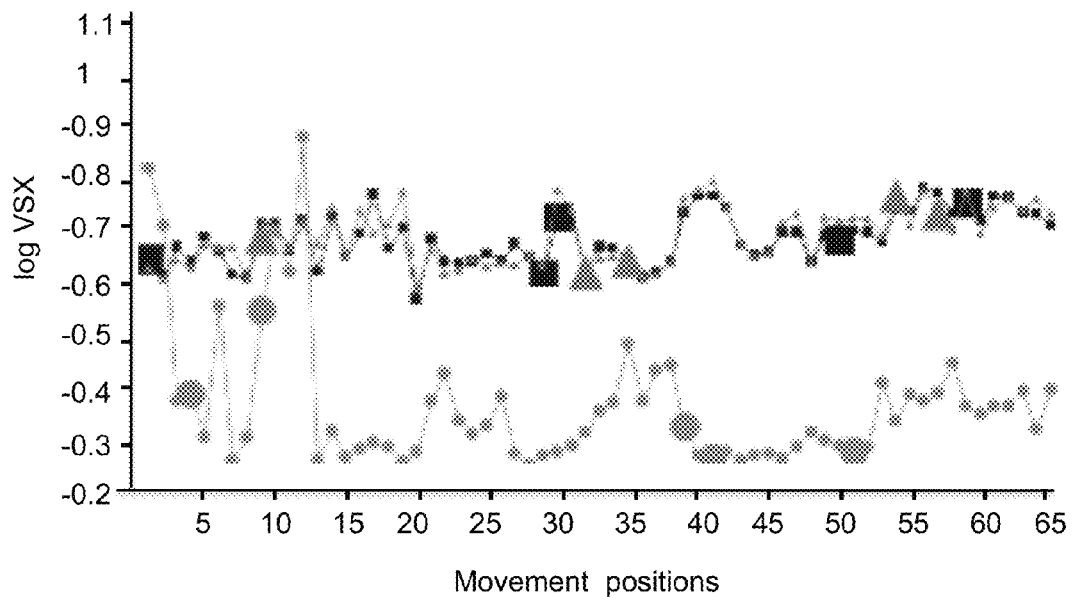
FIGS. 12A-12F compares the log VSX (FIGS. 12A, 12C, 12E) and the change of measured log MAR visual acuity (FIGS. 12B, 12D, 12F) over the contact lens movement for the first, second and third test subjects, respectively, for the SPGD optimized correction (●), the suggested $2^{nd}$ to $4^{th}$ order full magnitude correction (■) and the conventional correction (▲). Error bars represent 3 normal subjects under the visual acuity chart test.
Figure 12B:
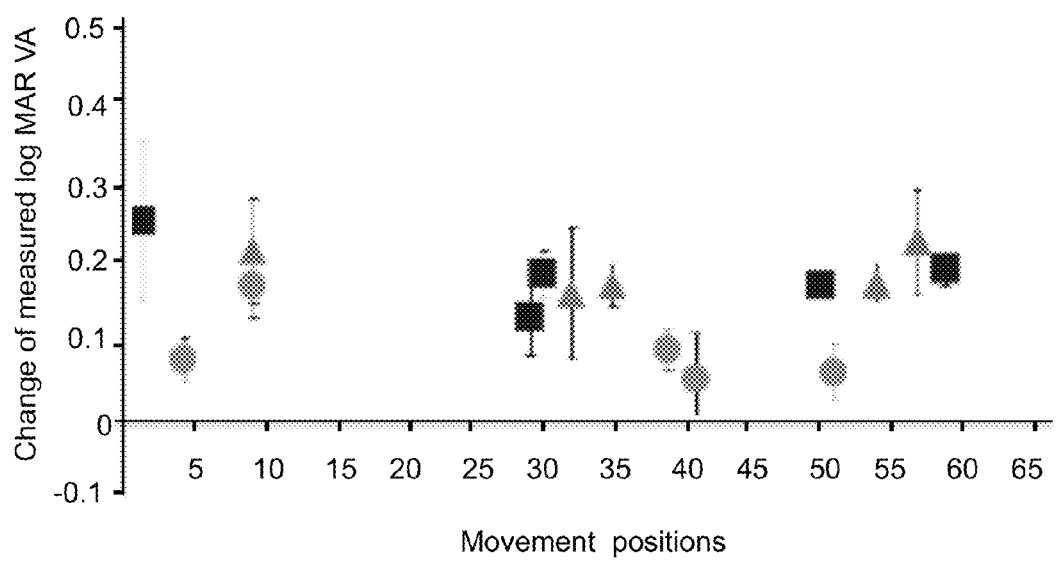

In FIG. 12A, for the first subject, over the contact lens movement, the optimized correction (circle) presented an overall log VSX better than that of Guirao's suggested correction (triangle), that of the full magnitude 2nd to 4th order correction (square) and far better than that of the conventional correction (not shown). The bigger data points in this figure represent the corresponding residual aberration structures that were selected for VA charts simulation. In FIG. 12B, the measured VAs of the selected, by log VSX percentile, residual aberration structures were plotted in terms of the movement so that it is easy to see the measured VAs of the selected residual aberration structures were consistently corresponded with its log VS values. The measured VAs of the optimized correction were better than those of Guirao's suggested correction, full magnitude 2nd to 4th order correction and conventional correction (not shown).

Figure 12C:
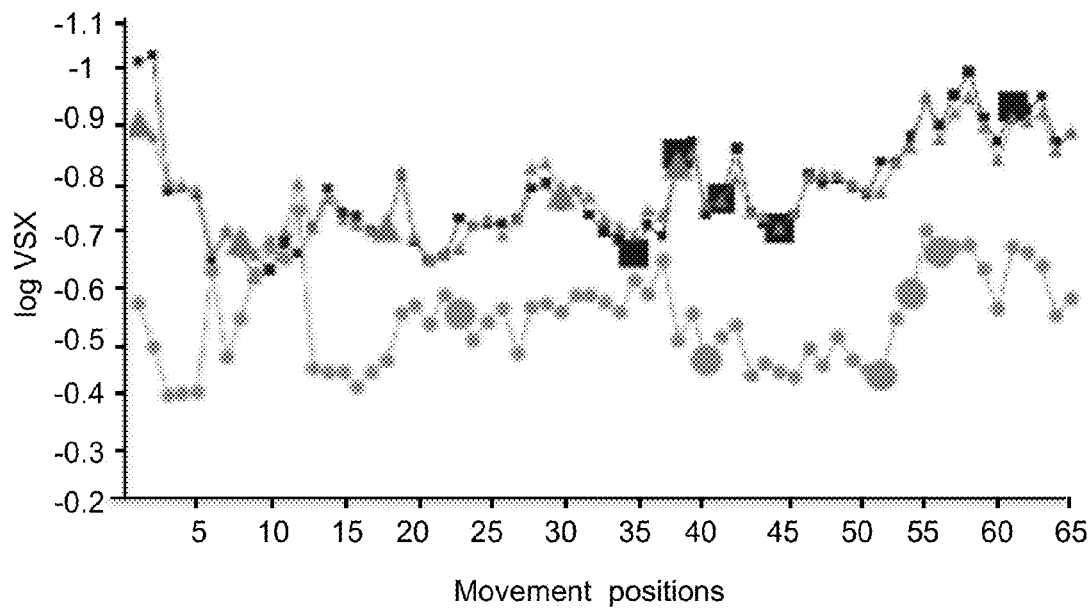
Figure 12D:
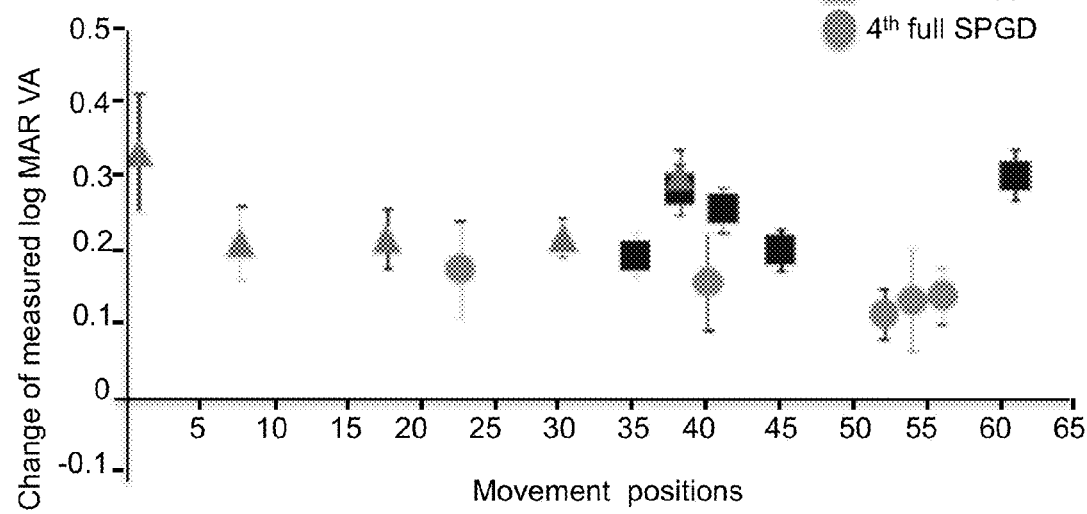
Figure 12E:
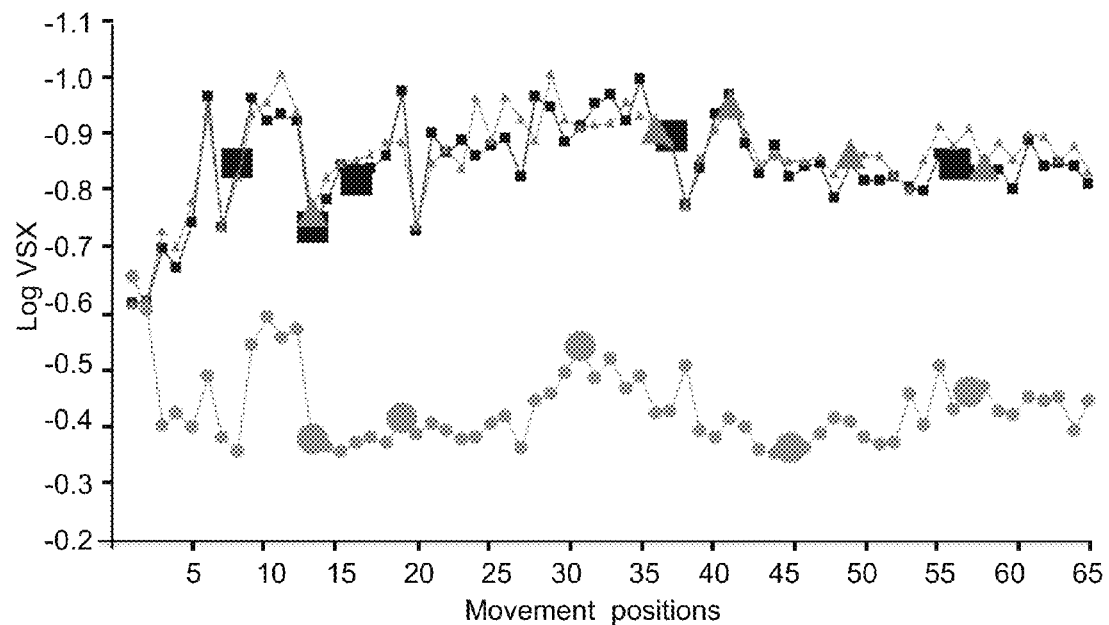
Figure 12F:
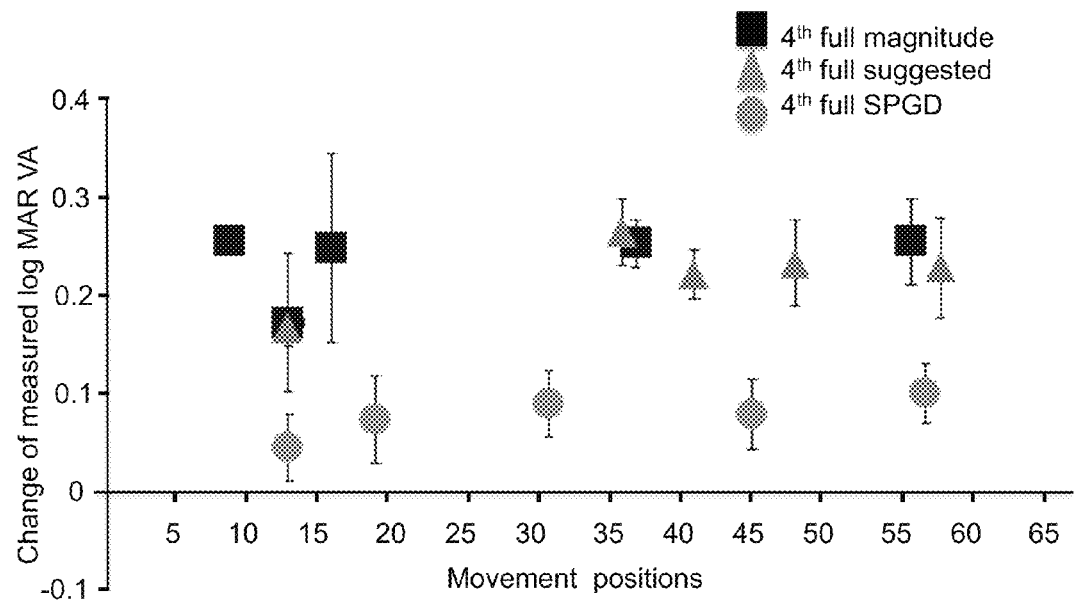

Similar to FIG. 12A, FIGS. 12C and 12E shown in the keratoconic eyes of the second and third subjects, the log VSX of the optimized correction overall better than that of Guirao correction, 2nd to 4th order full magnitude correction and the conventional correction. FIGS. 12D and 12F show that in corresponding to their log VSX, the measured log MAR acuitys for the selected residual aberration structures of the optimized corrections better overall than that of Guirao correction, $2^{nd}$ to $4^{th}$ order full magnitude correction and the conventional correction.

Figure 13:
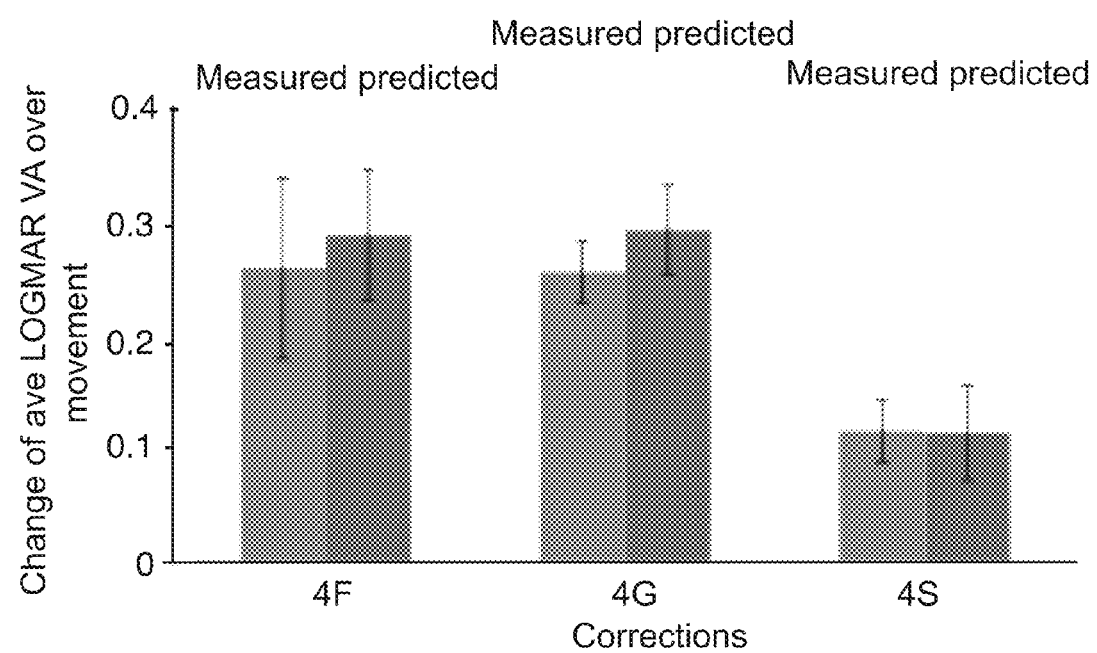
FIG. 13 compares the visual acuity of an optimized correction over other corrections.

To clearly quantify the improvement of VA of optimized correction over other corrections, the averaged change of log MAR acuity over the 3 kerataconic eyes for the first, second and third subjects for each correction was plotted. In FIG. 13, over 3 KC eyes for each of the corrections $2^{nd}$ to $4^{th}$ order full magnitude correction (4F), suggested prior correction (4G) and the SPGD optimized correction (4S), the measured VAs was close to the VAs predicted from log VSX. Correction 4S offered an improvement of measured VA of 1.4 and 1.4 lines over corrections 4G and 4F respectively. In terms of the difference between predicted VA and measured VA, there are no statistic significant differences between predicted and measured VAs in 4F (P=0.13), 4G (P=0.19) and 4S (P=0.88).

Figure 14A:
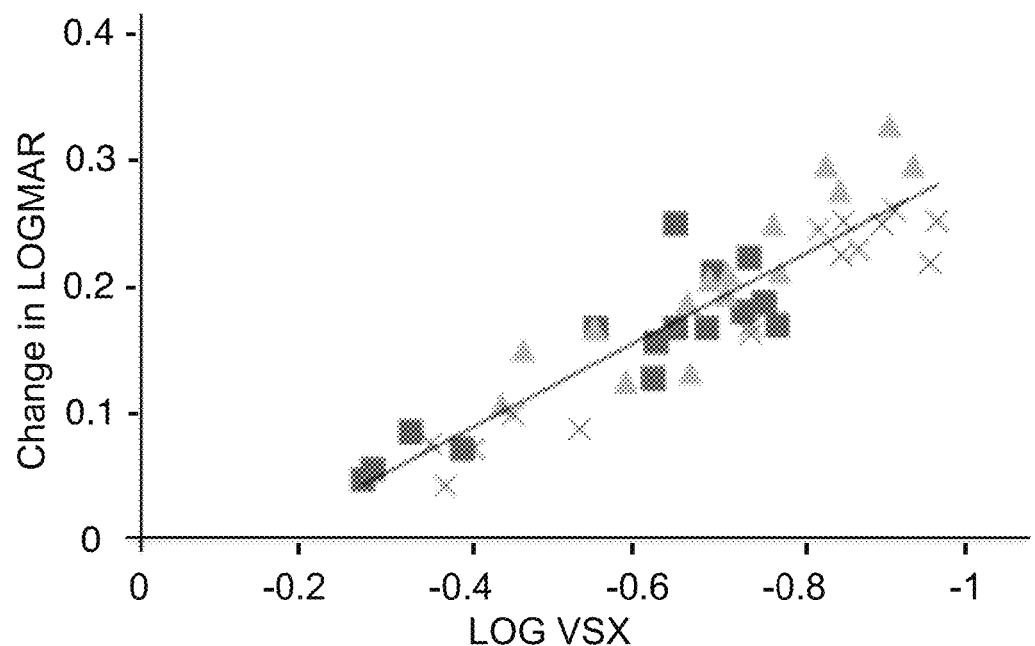
FIGS. 14A-14B compare the change in log MAR with the change in log VSX (FIG. 14A) and the measured change in log MAR with the predicted change (FIG. 14B). The different markings (■, ▲, X) represent data source from different KC eyes.
Figure 14B:
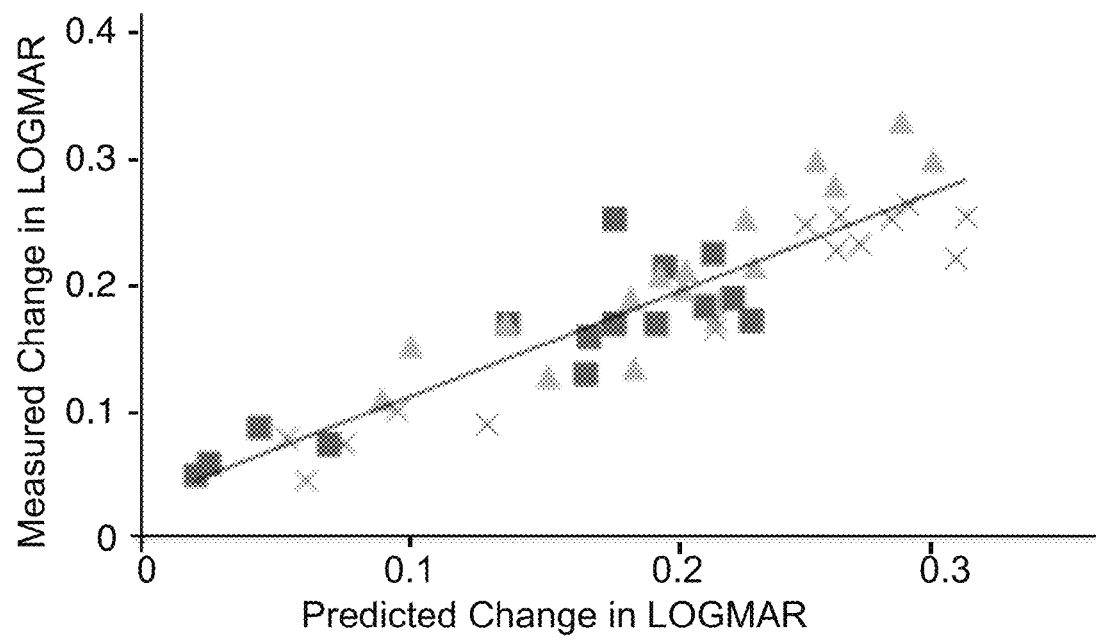
Figure 15:
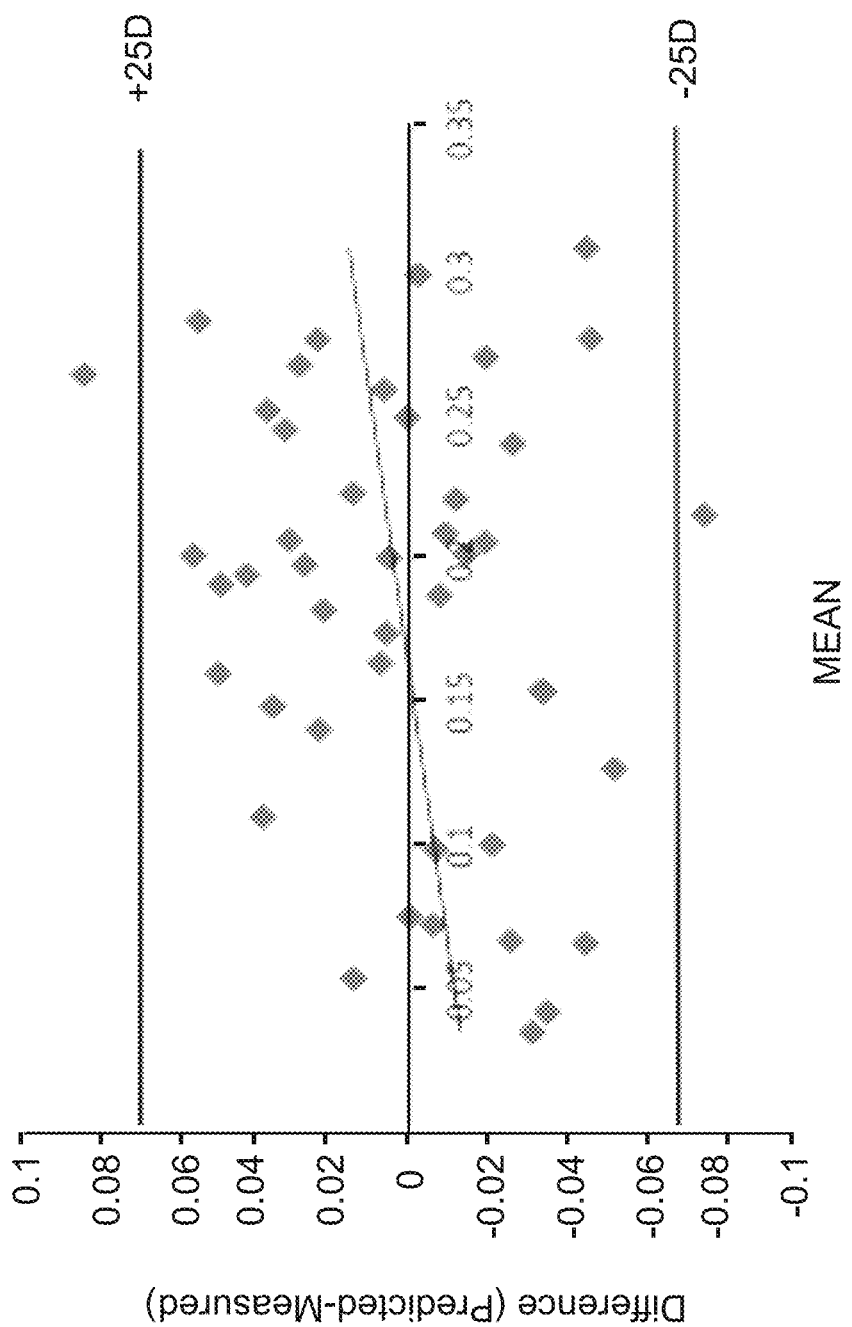
FIG. 15 is a Bland-Altman graph illustrating the difference between measured and predicted acuity.

FIGS. 14A-14B depict the results of an analysis of how the predicted visual acuity predicts the measured visual acuity. Measured acuity and predicted acuity were highly correlated (y=0.3448x–0.0486 and y=0.8173x+0.311, respectively and $R^2$=82% for both). FIG. 15 is a Bland-Altman chart for predicted and measured VA. Although there is a slope between the mean and difference of the predicted and measured VA, the slope is not significantly different from 0 (P=0.13). Two standard deviation of the difference was less than 4 letters, which is far smaller than the test-retest VA difference expected in a typical clinical setting (1.4 lines or 7 letters).

The following references are cited herein.
1. Marsack et al., Optometry Vision Sci, 84(6):463-470, 2007.
2. Katsoulos et al., Ophthalmic Physiol Opt, 29(3):321-329, 2009.
3. Sabesan et al., Opt Lett, 32:1000-1002, 2007.
4. Guirao et al., J Opt Soc Am A Opt Image Sci Vis, 18(5):1003-1015, 2001.
5. Guirao et al., J Opt Soc Am A Opt Image Sci Vis, 19(1):126-128, 2002.
6. Applegate et al., Optom Vis Sci, 80(2):97-105, 2003.
7. Tomlinson, A. and Bibby, M. M., Am J Optom Physiol Opt, 5795):275-279, 1980.
8. Castellano et al., J Am Optom Assoc, 61(3): 167-170, 1990.
9. Ravikumar, A., American Academy of Optometry, Boston, 2011.
10. Marsack et al., J Vis, 4(4):322-328, 2004.
11. Burton, G. J. and Haig, N. D., J Opt Soc Am A Opt Image Sci Vis, 1(4):373-385, 1984.
12. Cheng et al., Optometry Vision Sci, 87(5):300-312, 2010.
13. Sarver, E. J. and Applegate, R. A., J Refract Surg, 16(5):5611-5616, 2000.
14. Applegate, R. A. and Sarver, E. J., Modeling an Individual Eye's Visual Performance, Presented at Vision Science & Its Applications, Santa Fe, N. Mex., February 1999.
15. Doshi et al., J Refract Surg, 17(4):414-419, 2001.
16. Applegate et al., J Refract Surg, 18(5):5556-5562, 2002.
17. Brainard, D. H., Spat Vis, 10(4):433-436, 1997.

One skilled in the art will appreciate that the present invention is well adapted to carry out the objects and obtain the ends and advantages mentioned, as well as those objects, ends and advantages inherent herein.

What is claimed is:

1. A computer program product comprising a non-transitory computer-readable medium to store a computer readable algorithm which, when executed on a computer having at least a processor, a memory and a network connection, causes the computer to perform operations for optimizing a wavefront guided correction for a custom ophthalmic lens for an eye, comprising:
   receiving input comprising a quantified wavefront error of the eye;
   receiving input comprising a registration uncertainty quantified as a wavefront-guided correction over underlying wavefront error for the eye;
   identifying a metric of image quality that is predictive of a visual performance task of interest, said metric of image quality comprises acuity, plane detection, face identification, area under a contrast sensitivity function or a combination thereof; and
   determining a correction for the eye based on the inputs and the predictive metric that provides a level of visual performance within a user-defined performance range.

2. The computer program product of claim 1, further comprising software tangibly stored on the computer readable medium which, when executed on the computer, causes the computer to perform operations for manufacturing the ophthalmic lens comprising the custom correction.

3. The computer program product of claim 1, wherein the custom ophthalmic lens is an onlay lens, an inlay lens, an intraocular lens, or a contact lens.

4. The computer program product of claim 1, wherein the quantified wavefront error comprises a residual wavefront error of the eye.

5. The computer program product of claim 1, wherein the quantified registration uncertainty comprises movement or placement error of a correction on or in the eye.

6. The computer program product of claim 5, wherein the quantified registration uncertainty comprises error due to rotational movement or translational movement or both.

7. The computer program product of claim 1, wherein the metric is log visual Strehl.

8. The computer program product of claim 1, wherein the visual performance task of interest comprises visual acuity, contrast sensitivity, face recognition, or plane recognition.

9. The computer program product of claim 1, wherein the level of visual performance is a best possible visual performance with a smallest standard deviation within the user-defined performance range.

10. A method for optimizing a wavefront guided correction for a custom ophthalmic lens, comprising the steps of:
    measuring a residual wavefront error of an eye;
    quantifying translational and rotational movements of a lens on or in the eye for each of a plurality of sequential images thereof obtained over time;
    inputting values for the residual wavefront error and for the quantified translational and rotational movements into the algorithm of claim 1 configured to determine an optimal wavefront guided correction therefrom; and
    outputting the optimal wavefront guided correction for the ophthalmic lens.

11. The method of claim 10, further comprising manufacturing the custom ophthalmic lens from the optimal wavefront guided correction.

12. The method of claim 10, wherein the algorithm is configured to enable instructions for:
    calculating residual aberrations and a retinal image quality metric for each of the movements from the inputted values; and
    averaging retinal image quality across the plurality of movements.

13. The method of claim 10, wherein the optimal wavefront guided correction is determined using an objective metric that achieves a best possible visual performance and a smallest standard deviation.

14. The method of claim 13, wherein the objective metric is log visual Strehl.

15. The method of claim 10, wherein the optimal wavefront guided correction provides an optimal overall retinal image quality with minimal variation from movement of the lens on the eye.

16. The method of claim 10, wherein the eye is keratoconic or suffering from a disease that distorts the ocular optics.

17. An ophthalmic lens customized for a subject comprising the optimal wavefront guided correction outputted by the algorithm in the method of claim 10.

18. The ophthalmic lens of claim 17, comprising an onlay lens, an inlay lens, an intraocular lens, or a contact lens.

* * * * *